(12) United States Patent
Smith

(10) Patent No.: US 11,250,462 B2
(45) Date of Patent: Feb. 15, 2022

(54) SYSTEM AND METHOD FOR TRADING AND TRACKING DIGITIZED COUPONS

(71) Applicant: Benjamin D. Smith, Billings, MT (US)

(72) Inventor: Benjamin D. Smith, Billings, MT (US)

(73) Assignee: Benjamin D. Smith, Billings, MT (US)

( * ) Notice: Subject to any disclaimer, the term of this patent is extended or adjusted under 35 U.S.C. 154(b) by 0 days.

(21) Appl. No.: 16/850,732

(22) Filed: Apr. 16, 2020

(65) Prior Publication Data

US 2020/0334706 A1   Oct. 22, 2020

Related U.S. Application Data

(60) Provisional application No. 62/835,579, filed on Apr. 18, 2019.

(51) Int. Cl.
*G06Q 30/00* (2012.01)
*G06Q 30/02* (2012.01)
*G06Q 40/04* (2012.01)

(52) U.S. Cl.
CPC ......... *G06Q 30/0239* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 7,579,176 B2 | 8/2009 | Herrema | |
| 8,219,542 B2 | 7/2012 | Niejadlik | |
| 8,224,709 B2 | 7/2012 | Hirson | |
| 8,224,727 B2 | 7/2012 | Hirson | |
| 8,229,458 B2 | 7/2012 | Busch | |
| 8,359,274 B2 | 1/2013 | Yoder | |
| 8,412,155 B2 | 4/2013 | McCanna | |
| 8,412,626 B2 | 4/2013 | Hirson | |
| 8,438,165 B2 | 5/2013 | Ickman | |
| 8,447,669 B2 | 5/2013 | Antoo | |
| 8,485,430 B2 | 7/2013 | Qu | |
| 8,504,423 B2 | 8/2013 | Rotbard | |
| 8,510,661 B2 | 8/2013 | Dharmaji | |

(Continued)

FOREIGN PATENT DOCUMENTS

| AU | 2012/223415 B2 | 9/2012 |
|---|---|---|
| AU | 2011/316955 B2 | 12/2016 |

(Continued)

OTHER PUBLICATIONS iP.com search strategy dated May 12, 2021. (Year: 2021).*
STIC EIC 3600 Search Report dated May 17, 2021. (Year: 2021).*
IP.com Search Strategy dated May 13, 2021. (Year: 2021).*

*Primary Examiner* — Matthew T Sittner
(74) *Attorney, Agent, or Firm* — Nixon Peabody LLP

(57) ABSTRACT

A method of managing a plurality of unique digital coupons that can be transmitted to a plurality of known consumers, such that each of the plurality of known consumers is associated with a particular plurality of coupons that can be registered to, searched for, saved on, traded with, and merged or "stacked" together; all on a single platform so that every interaction is recorded, analyzed, scored and reported on in such a way that advertisers can identify new previously unknown consumers and incentivize them to become future customers using their existing marketing campaign and distribution methods.

28 Claims, 20 Drawing Sheets

(56) References Cited

U.S. PATENT DOCUMENTS

| | | |
|---|---|---|
| 8,527,335 B1 | 9/2013 | MacArthur |
| 8,538,806 B2 | 9/2013 | Kuznetsov |
| 8,538,845 B2 | 9/2013 | Liberty |
| 8,543,087 B2 | 9/2013 | Davis |
| 8,548,426 B2 | 10/2013 | Smith |
| 8,554,605 B2 | 10/2013 | Oleson |
| 8,560,384 B2 | 10/2013 | Patel |
| 8,566,188 B2 | 10/2013 | Smith |
| 8,583,496 B2 | 11/2013 | Yoo |
| 8,615,427 B2 | 12/2013 | Goel |
| 8,626,545 B2 | 1/2014 | Van Pelt |
| 8,631,089 B1 | 1/2014 | Pereira |
| 8,660,911 B2 | 2/2014 | Hirson |
| 8,660,948 B2 | 2/2014 | Dessert |
| 8,699,994 B2 | 4/2014 | Kim |
| 8,700,524 B2 | 4/2014 | Williams |
| 8,700,530 B2 | 4/2014 | Smith |
| 8,701,051 B2 | 4/2014 | Dharmaji |
| 8,735,113 B2 | 5/2014 | Herrema |
| 8,738,454 B2 | 5/2014 | Argue |
| 8,768,778 B2 | 7/2014 | Smith |
| 8,783,561 B2 | 7/2014 | Wesley |
| 8,799,060 B2 | 8/2014 | Gillenson |
| 8,799,162 B2 | 8/2014 | Yoo |
| 8,827,799 B1 | 9/2014 | Brown |
| 8,843,398 B2 | 9/2014 | Argue |
| 8,845,337 B1 | 9/2014 | Hu |
| 8,849,699 B2 | 9/2014 | Durvasula |
| 8,874,671 B2 | 10/2014 | Pasquero |
| 8,905,763 B1 | 12/2014 | Hu |
| 8,914,866 B2 | 12/2014 | Kontsevich |
| 8,924,292 B1 | 12/2014 | Ellis |
| 8,944,313 B2 | 2/2015 | Williams |
| 8,983,924 B2 | 3/2015 | Ickman |
| 9,040,267 B2 | 5/2015 | Herrema |
| 9,064,254 B2 | 6/2015 | Todeschini |
| 9,085,784 B1 | 7/2015 | Herrema |
| 9,092,683 B2 | 7/2015 | Koziol |
| 9,111,290 B2 | 8/2015 | Delgado |
| 9,111,301 B2 | 8/2015 | McGuire |
| 9,116,935 B1 | 8/2015 | Esov |
| 9,117,225 B2 | 8/2015 | Rai |
| 9,129,320 B2 | 9/2015 | Martin |
| 9,177,327 B2 | 11/2015 | Chang |
| 9,189,794 B2 | 11/2015 | Dharmaji |
| 9,191,217 B2 | 11/2015 | Martell |
| 9,195,988 B2 | 11/2015 | Fischer |
| 9,208,488 B2 | 12/2015 | Liberty |
| 9,224,172 B2 | 12/2015 | Churchill |
| 9,253,589 B2 | 2/2016 | McCann |
| 9,262,775 B2 | 2/2016 | LaMont |
| 9,275,407 B2 | 3/2016 | McLaughlin |
| 9,355,393 B2 | 5/2016 | Purves |
| 9,361,620 B2 | 6/2016 | Evans |
| 9,384,495 B1 | 7/2016 | Cope |
| 9,430,773 B2 | 8/2016 | Aloni |
| 9,443,253 B2 | 9/2016 | Carlson |
| 9,449,313 B2 | 9/2016 | Smith |
| 9,466,075 B2 | 10/2016 | Carlson |
| 9,477,967 B2 | 10/2016 | Spears |
| 9,489,680 B2 | 11/2016 | Baker |
| 9,519,892 B2 | 12/2016 | Martell |
| 9,519,934 B2 | 12/2016 | Calman |
| 9,542,690 B2 | 1/2017 | Tiku |
| 9,558,386 B2 | 1/2017 | Yeakley |
| 9,558,502 B2 | 1/2017 | Carlson |
| 9,558,505 B2 | 1/2017 | Wolf |
| 9,558,507 B2 | 1/2017 | Zilkha |
| 9,582,598 B2 | 2/2017 | Kalgi |
| 9,595,028 B2 | 3/2017 | Davis |
| 9,613,361 B2 | 4/2017 | Wolf |
| 9,619,817 B1 | 4/2017 | Forester |
| 9,646,342 B2 | 5/2017 | Caiman |
| 9,652,761 B2 | 5/2017 | Smith |
| 9,679,299 B2 | 6/2017 | Yoder |
| 9,697,520 B2 | 7/2017 | MacIlwaine |
| 9,710,636 B1 | 7/2017 | Redpath |
| 9,710,807 B2 | 7/2017 | Theurer |
| 9,715,700 B2 | 7/2017 | Chomsky |
| 9,754,278 B2 | 9/2017 | King |
| 9,767,467 B2 | 9/2017 | Gebb |
| 9,805,351 B2 | 10/2017 | Harman |
| 9,811,836 B2 | 11/2017 | Brouhard |
| 9,818,125 B2 | 11/2017 | Mullen |
| 9,830,622 B1 | 11/2017 | Martell |
| 9,842,342 B2 | 12/2017 | Harman |
| 9,881,315 B2 | 1/2018 | Shiffert |
| 9,934,537 B2 | 4/2018 | Berland |
| 9,953,334 B2 | 4/2018 | Heitmueller |
| 9,953,378 B2 | 4/2018 | Purves |
| 9,967,091 B2 | 5/2018 | Vandervort |
| 9,972,021 B2 | 5/2018 | Yoder |
| 9,990,623 B2 | 6/2018 | Smith |
| 9,996,859 B1 | 6/2018 | Koshy |
| 10,002,353 B2 | 6/2018 | Kimberg |
| 10,055,745 B2 | 8/2018 | Carlson |
| 10,083,464 B1 | 9/2018 | Ruxton |
| 10,089,701 B2 | 10/2018 | Harman |
| 10,102,591 B2 | 10/2018 | McLaughlin |
| 10,121,129 B2 | 11/2018 | Kalgi |
| 10,127,578 B2 | 11/2018 | Greenough |
| 10,147,130 B2 | 12/2018 | Scholl |
| 10,192,243 B1 | 1/2019 | Genc-Kaya |
| 10,223,707 B2 | 3/2019 | Granville |
| 10,223,710 B2 | 3/2019 | Purves |
| 10,223,730 B2 | 3/2019 | Shastry |
| 10,242,358 B2 | 3/2019 | Purves |
| 10,255,620 B1 | 4/2019 | Koren |
| 10,262,148 B2 | 4/2019 | Cote |
| 10,290,018 B2 | 5/2019 | Spears |
| 10,292,008 B2 | 5/2019 | Nack |
| 10,297,105 B2 | 5/2019 | LeMay |
| 10,304,091 B1 | 5/2019 | Scholl |
| 10,304,093 B2 | 5/2019 | Larrain |
| 10,313,480 B2 | 6/2019 | Greene |
| 10,318,914 B1 | 6/2019 | Arora |
| 10,318,941 B2 | 6/2019 | Chawla |
| 10,332,142 B2 | 6/2019 | Wagner |
| 10,354,268 B2 | 7/2019 | Celikyilmaz |
| 10,360,592 B1 | 7/2019 | Emigh |
| 10,380,535 B1 | 8/2019 | Arora |
| 10,380,617 B2 | 8/2019 | Carlson |
| 10,387,845 B2 | 8/2019 | Jones-McFadden |
| 10,387,846 B2 | 8/2019 | Jones-McFadden |
| 10,395,237 B2 | 8/2019 | Neelikattil |
| 10,395,268 B1 | 8/2019 | Desai |
| 10,395,269 B2 | 8/2019 | Catania |
| 10,417,701 B2 | 9/2019 | Secrist |
| 10,419,379 B2 | 9/2019 | Celikyilmaz |
| 10,430,798 B2 | 10/2019 | Volpi |
| 10,430,824 B1 | 10/2019 | Potamias |
| 10,438,176 B2 | 10/2019 | Johnson |
| 10,438,196 B2 | 10/2019 | Liberty |
| 10,438,299 B2 | 10/2019 | Amaro |
| 10,467,331 B2 | 11/2019 | Bernath |
| 10,489,754 B2 | 11/2019 | Fineman et al. |
| 10,497,022 B2 | 12/2019 | Carlson |
| 10,504,132 B2 | 12/2019 | Chatterjee |
| 10,511,692 B2 | 12/2019 | Greene |
| 10,521,813 B2 | 12/2019 | Okerlund |
| 10,524,165 B2 | 12/2019 | Greene |
| 10,546,332 B2 | 1/2020 | Carlson |
| 10,572,891 B2 | 2/2020 | Walz |
| 10,586,227 B2 | 3/2020 | Makhdumi |
| 2007/0156513 A1* | 7/2007 | Mastrianni ......... G06Q 30/0208 705/14.11 |
| 2008/0052169 A1* | 2/2008 | O'Shea ................. G06Q 30/02 705/14.17 |
| 2009/0076912 A1* | 3/2009 | Rajan ................. G06Q 30/0273 705/14.64 |
| 2010/0161404 A1 | 6/2010 | Taylor |
| 2011/0010234 A1 | 1/2011 | Lindelsee |
| 2011/0208603 A1 | 8/2011 | Benefield |
| 2011/0210170 A1 | 9/2011 | Arguello |

(56) References Cited

U.S. PATENT DOCUMENTS

| | | |
|---|---|---|
| 2011/0213671 A1 | 9/2011 | Hirson |
| 2011/0217994 A1 | 9/2011 | Hirson |
| 2011/0225034 A1 | 9/2011 | Bayat |
| 2011/0264490 A1 | 10/2011 | Durvasula |
| 2011/0270660 A1 | 11/2011 | Bettioi |
| 2011/0313820 A1 | 12/2011 | Biewald |
| 2012/0010930 A1 | 1/2012 | Langdon |
| 2012/0047003 A1 | 2/2012 | Hauuad |
| 2012/0053999 A1 | 3/2012 | Pan |
| 2012/0066051 A1 | 3/2012 | Black |
| 2012/0101881 A1 | 4/2012 | Taylor |
| 2012/0130793 A1 | 5/2012 | Greenbaum |
| 2012/0157190 A1 | 6/2012 | Hungate |
| 2012/0166261 A1* | 6/2012 | Velusamy ........ G06Q 30/0214 705/14.16 |
| 2012/0203623 A1 | 8/2012 | Sethi |
| 2012/0215609 A1 | 8/2012 | Yoo |
| 2012/0215613 A1 | 8/2012 | Madhok |
| 2012/0215618 A1 | 8/2012 | Myman |
| 2012/0221437 A1 | 8/2012 | Yoo |
| 2012/0271691 A1 | 10/2012 | Hauuad |
| 2012/0271702 A1 | 10/2012 | MacLachlan |
| 2012/0278127 A1 | 11/2012 | Kirakosyan |
| 2012/0296737 A1 | 11/2012 | Wolff |
| 2012/0330736 A1 | 12/2012 | Beckner |
| 2013/0006746 A1 | 1/2013 | Moore |
| 2013/0030894 A1 | 1/2013 | Bloom |
| 2013/0060641 A1 | 3/2013 | Gharabally |
| 2013/0072114 A1 | 3/2013 | Abhyanker |
| 2013/0073356 A1 | 3/2013 | Cooper |
| 2013/0117084 A1 | 5/2013 | Rooke |
| 2013/0124280 A1 | 5/2013 | Yilmaz |
| 2013/0132175 A1 | 5/2013 | Claessen |
| 2013/0132220 A1 | 5/2013 | Baum |
| 2013/0132574 A1 | 5/2013 | Rothschild |
| 2013/0151326 A1 | 6/2013 | Engstrom |
| 2013/0166370 A1 | 6/2013 | Weber |
| 2013/0179258 A1 | 7/2013 | Moskos |
| 2013/0238408 A1 | 9/2013 | Cooke |
| 2013/0246300 A1 | 9/2013 | Fischer |
| 2013/0290096 A1 | 10/2013 | Lizotte |
| 2013/0304578 A1 | 11/2013 | Kannan |
| 2013/0325570 A1 | 12/2013 | Drozd |
| 2013/0325576 A1 | 12/2013 | Drozd |
| 2013/0325582 A1 | 12/2013 | Drozd |
| 2013/0339135 A1 | 12/2013 | Drozd |
| 2013/0339143 A1 | 12/2013 | Drozd |
| 2014/0006121 A1 | 1/2014 | Barker |
| 2014/0006122 A1 | 1/2014 | Barker |
| 2014/0052521 A1 | 2/2014 | Drozd |
| 2014/0058818 A1 | 2/2014 | Drozd |
| 2014/0058823 A1* | 2/2014 | Ross ................ G06Q 30/0238 705/14.38 |
| 2014/0067803 A1 | 3/2014 | Kapadia |
| 2014/0081726 A1 | 3/2014 | Cooke |
| 2014/0149196 A1 | 5/2014 | Drozd |
| 2014/0180792 A1 | 6/2014 | Zaheer |
| 2014/0195327 A1 | 7/2014 | Tomasz |
| 2014/0207557 A1* | 7/2014 | Choi ................ G06Q 30/0239 705/14.39 |
| 2014/0214549 A1 | 7/2014 | Elbaum |
| 2014/0229288 A2 | 8/2014 | Teichner |
| 2014/0257945 A1 | 9/2014 | Sandridge |
| 2014/0279420 A1 | 9/2014 | Okerlund |
| 2014/0280339 A1 | 9/2014 | Jain |
| 2014/0289092 A1 | 9/2014 | Keir |
| 2014/0297382 A1 | 10/2014 | Chiussi |
| 2014/0304187 A1 | 10/2014 | Menn |
| 2014/0324598 A1 | 10/2014 | Freeman |
| 2014/0344335 A1 | 11/2014 | Lopez |
| 2014/0372193 A1 | 12/2014 | Jorgensen |
| 2014/0379451 A1 | 12/2014 | Cole |
| 2015/0032527 A1 | 1/2015 | Hunt |
| 2015/0039392 A1 | 2/2015 | Kobres |
| 2015/0106183 A1* | 4/2015 | McEvilly ............ H04W 4/025 705/14.25 |
| 2015/0127548 A1 | 5/2015 | Chauhan |
| 2015/0254704 A1 | 9/2015 | Kothe |
| 2015/0302424 A1 | 10/2015 | Akbarpour |
| 2015/0369783 A1 | 12/2015 | Hamada |
| 2016/0048867 A1 | 2/2016 | Joa |
| 2016/0104177 A1 | 4/2016 | Bridwell |
| 2016/0210682 A1 | 7/2016 | Kannan |
| 2016/0328730 A1 | 11/2016 | Salamon |
| 2018/0114231 A1 | 4/2018 | Deluca |
| 2018/0130096 A1 | 5/2018 | Dun |

FOREIGN PATENT DOCUMENTS

| | | |
|---|---|---|
| AU | 2013/214801 B2 | 6/2018 |
| CN | 102637283 A | 8/2012 |
| CN | 102819808 A | 12/2012 |
| CN | 102833069 A | 12/2012 |
| CN | 103745392 A | 4/2013 |
| CN | 108537582 A | 9/2018 |
| GB | 2457445 A | 8/2009 |
| JP | 5798581 B2 | 10/2015 |
| JP | 5809693 B2 | 11/2015 |
| JP | 6318122 B2 | 4/2018 |
| KR | 101089944 B1 | 12/2011 |
| KR | 101829254 B1 | 2/2018 |
| SG | 186502 A1 | 1/2013 |
| WO | WO 2012/012751 A2 | 1/2012 |
| WO | WO 2012/051355 A1 | 4/2012 |
| WO | WO 2012/075054 A2 | 6/2012 |
| WO | WO 2012/106655 A2 | 8/2012 |
| WO | WO 2012/116125 A1 | 8/2012 |
| WO | WO 2012/122060 A1 | 9/2012 |
| WO | WO 2012/134919 A1 | 10/2012 |
| WO | WO 2012/150592 A1 | 11/2012 |
| WO | WO 2012/155081 A1 | 11/2012 |
| WO | WO 2012/167202 A2 | 12/2012 |
| WO | WO 2013/009446 A1 | 1/2013 |
| WO | WO 2013/090611 A2 | 6/2013 |
| WO | WO 2013/098569 A1 | 7/2013 |
| WO | WO 2013/106940 A1 | 7/2013 |
| WO | WO 2014/190333 A1 | 11/2014 |
| WO | WO 2014/204874 A1 | 12/2014 |
| WO | WO 2015/069901 A1 | 5/2015 |
| WO | WO 2016/003500 A1 | 1/2016 |
| WO | WO 2016/039607 A1 | 3/2016 |
| WO | WO 2016/068687 A1 | 5/2016 |

* cited by examiner

SYSTEM AND METHOD FOR TRADING AND TRACKING DIGITIZED COUPONS

CROSS REFERENCE TO RELATED APPLICATIONS

This application claims the benefit of and priority to U.S. Provisional Application No. 62/835,579, filed on Apr. 18, 2019, which is hereby incorporated by reference herein in its entirety.

TECHNICAL FIELD

This disclosure relates to digital coupons and more specifically to tracking and analyzing digital coupons traded among consumers to aid in identifying and predicting customers.

BACKGROUND

Advertisers typically cannot accurately predict the purchasing intentions of potential customers and therefore tend to waste marketing resources (e.g., sending coupons to consumers that are not likely to be customers). Moreover, consumers do not inform advertisers as to when they plan on making a purchase or if they are even in the market for an advertiser's product or service.

While advertisers may know the individual consumers who they initially market to (e.g., send a coupon), the advertiser does not know if those consumers are interested in the advertised product(s) or service(s) at any particular time.

There are also many informational gaps between when an advertiser first markets to a consumer and any resulting consumer purchase that may affect those marketing efforts in the future. This informational gap prevents and/or impedes tracking of the marketing and degrades the attribution quality of the data that the advertiser has on knowing which consumer was originally marketed to and which consumer actually becomes a customer.

Due to the lack of insight into a consumer's purchase intentions, advertisers typically resort to mass marketing methods to increase awareness and reach as many potential consumers that they can, knowing only a small percentage of consumers will respond and ultimately purchase from them. This results in an extremely inefficient use of marketing capital for the advertiser.

Further, advertisers are left with poor quality data to strategize future marketing efforts with and ultimately continue to waste marketing budgets by advertising to consumers who have no intention of becoming future customers.

The present disclosure is directed to solving these and other problems.

SUMMARY

According to some implementations of the present disclosure, advertisers are aided in knowing when a consumer plans on making a purchase. Such knowledge allows the advertiser to be able to efficiently target its marketing efforts, for example, to only the specific consumers with intentions to purchase the advertiser's product or service in the future or near future. Predicting which consumer will become a customer is not possible with the current marketing methods, because the actual purchase intentions of a consumer is not traceable with the context of existing marketing methods.

According to some implementations of the present disclosure, a platform for advertisers is provided to track, identify, and predict which consumers may have intentions to purchase their product(s) or service(s). The platform does so by tracking the complete lifecycle of uniquely identifiable coupons (e.g., digital coupons, digitized analog coupons, etc.), which involves various transactions with the coupons like trading, selling, using, etc. The uniquely identifiably coupons are registered with the platform.

According to some implementations of the present disclosure, a coupon exchange platform for advertisers and consumers is used in the following manner:

1) Advertisers manage the distribution, registration, trading, and the redemption of unique coupons through the platform. This allows the advertiser to control the cost of their marketing campaigns by knowing exactly how many coupons, and at what value, they have issued on the platform for a particular campaign (e.g., 1000 unique coupons for $2 each or $2000 in total value).
   a) The coupons established by the advertiser on the platform are uniquely identifiable and record various aspects of a specific product or service offered by the advertiser. Examples of a coupon's aspects include, but are not limited to (i) redemption value, (ii) expiration date, (iii) redemption location requirements, (iv) type, description of, or scope of the product or service, or any combination thereof.
   b) The number of coupons established by the advertiser on the platform are controlled by the advertiser on the platform and are for a specific product or service offered by the advertiser.
   c) The coupons may be represented to the consumer in a physical or digital form, such as a printed paper coupon or a link to a website that depicts a digital coupon.
2) Consumers combine or stack similar coupons of the same type and scope, issued from the same advertiser as a means of virtually redeeming the coupon in a cumulative manner to create a new coupon valued at the sum of all the coupons combined or stacked. For example, one consumer can collect three unique coupons of the same value (e.g., $2 off a sandwich) and redeem all three unique coupons during a single purchase (e.g., $6 off the sandwich).
   a) The coupons combined by the consumer on the platform would result in combined aspects in a cumulative manner. Examples of a coupon's combined aspects could include, but are not limited to (i) cumulative redemption value (e.g., coupon value of: $1+$1+$1=$3), (ii) cumulative expiration date (e.g., coupon valid for: 1 day+1 day+1 day=3 days), or any combination thereof.
   b) The coupons combined by the consumer on the platform can result in the subsequent reduction in the number of coupons of the same type and scope, issued by the same advertiser, still available to be redeemed physically, since this is would be an act of virtual redemption of those combined coupons to create a new coupon of equivalent value.
3) Consumers ignore, redeem, collect, and/or trade the unique coupons with other consumers in an exchange marketplace on the platform.
   a) A consumer's action of ignoring (e.g., permitting coupon to expire without trading or redeeming the coupon) a unique coupon allows the advertiser to learn that consumer has little interest in their product or service as the platform tracks the complete lifecycle of the unique coupon and any ignored coupons eventually expire. In some implementations, an ignore feature is included where a consumer that receives a coupon can actively ignore it by selecting and/or activating an ignore element to indicate to the advertiser that the consumer is not interested in the coupon. In some such implementations, the consumer is rewarded for actively ignoring the coupon by receiving a new coupon from the same or different advertiser that the consumer may be more interested in receiving. As such, the original advertiser is able to reissue the actively ignored coupon to a different potential customer without increasing the budget of the campaign as the total number of outstanding coupons would remain the same.

b) A consumer's action of redeeming a unique coupon allows the advertiser to identify which consumer became a customer as the platform tracks the complete lifecycle of the unique coupon.

c) A consumer's action of trading one of the unique coupons through the platform with other potential consumers allows for the discovery of new and previously unknown consumers for the advertiser as all transactions or exchanges of the coupon are done by consumers registered on the platform.

d) A consumer's action of collecting similar unique coupons of the same product or service from the advertiser through the platform allows the advertiser to learn about the purchase intentions are of that consumer and what products or services are of value to the consumer.

According to some implementations of the present disclosure, the platform permits the tracking of related direct, secondary, and/or subsequent interactions that may occur between consumers, through the exchanging of those coupons between other consumers on the platform. Direct actions that a consumer performs in relation to the coupons can be tracked on the platform. Examples of actions a consumer may perform on the platform could include, but are not limited to: (i) making a registered coupon searchable by other consumers, (ii) searching for coupons available for trade, (iii) trading coupons with other consumers, (iv) combining or stacking coupons together that are the same type from the same advertiser, or any combination thereof. Secondary transactions that occur between consumers with the coupons can be tracked on the platform. Subsequent exchanges of which coupons from which advertisers to which consumers can also be tracked as the transactions on the platform can involve many coupons offered by many advertisers to many consumers.

According to some implementations of the present disclosure, the platform permits advertisers to manipulate various aspects of a registered coupon on the platform, between its initial issuance and final redemption, to influence a consumer to take action. Aspects of a coupon can be manipulated by the advertiser who issued the coupon after a coupon is registered on the platform and before the coupon is redeemed and still in an unredeemed virtual state. Examples of a coupon's aspects that could be manipulated include, but are not limited to: (i) changing of the redemption value of a coupon (e.g., increasing the value to entice customer action), (ii) changing of the expiration date of a coupon, (iii) changing of the redemption location requirements of a coupon, (iv) changing of the type, description of, or scope of product or service that the coupon represents, (v) changing the cumulative value of multiple coupons, that are of the same type, when they are stacked together (e.g., applying a multiplier for stacked coupons to increase or decreases the stacked face value), or any combination thereof.

In such implementations where coupons are stacked together, a multiplier can be applied automatically to alter the stacked value of the coupons. For example, where each coupon has a face value of $2 off a product, the stacking of two such coupons may result in a 1.2 multiplier being applied to the value such that the stacked coupon value becomes ($2+$2)*1.2=$4.8. In some such implementations, the multiplier can vary with the number of coupons in the stack. For example, two stacked coupons can have a multiplier of 1.1, where three stacked coupons have a multiplier of 1.2, where four stacked coupons have a multiplier of 1.3. Such multipliers can be used to encourage stacking. Similarly, for advertisers that want to discourage stacking, the multipliers can be used to reduce the cumulative value of stacked coupons. For example, the stacking of two $2 coupons can result automatically in a 0.9 multiplier being applied to reduce the face value of the stacked coupons from $4 to $3.6.

According to some implementations where coupons are stacked together, the stacking of a predetermined number of coupons (e.g., two coupons, three coupons, five coupons, ten coupons, etc.) can unlock a hidden feature. Examples of the hidden feature include a multiplier that is applied to the stacked value of the coupons, a new/extra coupon for the same or different product from the same or different advertiser, a free gift, a free or discounted subscription to one or more services (magazines, sock subscriptions, tie subscriptions, coffee subscriptions, etc.), or any combination thereof.

According to some implementations of the present disclosure, the platform only permits coupons to be traded where the coupons have the same face value. Such trading can be referred to as a one-for-one trade. For example, a first coupon for a first product with a face value of $4 can only be traded for a second coupon with a face value of $4, where the second coupon is for a second product or the first product.

According to some implementations of the present disclosure, the platform permits stacked coupons to be traded where the stacked coupons have the same stacked face value as a second coupon or a second stack of coupons. For example, a first consumer stacks three $1 coupons thereby forming a stacked face value of $3. In some implementations, the platform permits that first consumer to trade the stacked coupons (with a $3 stacked face value) for a second coupon (i.e., single, unstacked coupon) with a face value of $3 or for a second stack of coupons with a stacked face value of $3. As such, the total amount of the face value in the trade is equal.

According to some implementations of the present disclosure, the platform permits additional information to be inferred or derived from the analyzing of transactional data on the platform. Such inferences can include:

1. An actual market demand for a specific advertiser's coupon can be inferred and/or derived from a number of transactions involving the exchanging of related coupons (e.g., coupons for discounts on the same product having the same or different amounts) between consumers on the platform.

2. A perceived market value of an advertiser's coupon in the minds of consumers can be inferred and/or derived from the number of transactions involving the exchanging of such coupons with other coupons have the same or different value between consumers on the platform. For example, the trading of a $4 coupon related to a first product for a $2 coupon related to a second product permits the inference that the $4 coupon is not as valued in the eye of the consumer that traded it for the $2 coupon.

3. Collectability of an advertiser's coupon in the minds of consumers can be inferred and/or derived from the number of transactions involved in exchanging of such coupons between consumers on the platform.

4. A quantity of influence to invoke a consumer to take action resulting from one or more manipulations of a coupon's aspects can be inferred and/or derived from the number of transactions involving the exchanging of such coupons between consumers on the platform and/or from the act of redeeming such coupon(s) within a predetermine amount of time after such one or more manipulations of the coupon's aspects occurred.

5. An ability to score or rank variables tracked on the platform that can only be known by the monitoring of such transactions on the platform. Examples of variables that could be scored or ranked include, but are not limited to (i) the speed of transmission or how fast a coupon progresses through its lifecycle by consumers of a certain demographic or location, (ii) the ranking of which coupons are in the most demand by consumers of a certain demographic or location in relation to any current or changed aspect of a coupon, (iii) the number of times a coupon exchanges ownership between consumers of a certain demographic or location, (iv) the search results of coupons available for trade by consumers, (v) the search results of demographic data on consumers and their inferred or derived market demand the products or services by advertisers, or any combination thereof.

According to some implementations of the present disclosure, a platform is provided to enable consumers to trade or exchange coupons with other consumers. The coupons can be offered by various advertisers. In some implementations, the platform permits advertisers to manage the distribution, registration, trading and the redemption of unique coupons. In some implementations, the platform permits consumers to combine or stack similar coupons of the same type and/or scope, issued from the same advertiser, as a means of virtually redeeming the coupon in a cumulative manner to create a new coupon valued at the sum of all the coupons combined or stacked. In some implementations, the platform permits consumers to ignore, redeem, collect or even trade the coupons with other consumers in an exchange marketplace.

According to some implementations of the present disclosure, a platform is provided for the tracking of related direct, secondary, and/or subsequent interactions that may occur between consumers, through the exchanging of coupons between other consumers. In some implementations, all direct actions that a consumer performs in relation to the coupons are tracked. In some implementations, all secondary transactions that occur between consumers with the coupons are tracked. In some implementations, all subsequent exchanges of which coupons from which advertisers to which consumers are tracked.

According to some implementations of the present disclosure, a platform is provided for predicting which consumers will become customers based on pre-sale actions consumers perform with coupons. In some implementations, the analyzing of all actions consumers perform results in the ranking or scoring of consumers for the advertiser. In some implementations, the analyzing of all actions consumers perform results in determining the market demand or value of an advertiser's coupon.

According to some implementations of the present disclosure, a platform is provided to allow advertisers to manipulate various aspects of a coupon, between its initial issuance and final redemption, to influence a consumer to take action. In some implementations, all aspects of a coupon can be manipulated by the advertiser who issued the coupon after the coupon is registered on the platform, before the coupon is redeemed, and while the coupon is still in a virtual state.

According to some implementations of the present disclosure, a platform is provided to allow additional information to be inferred or derived from the analyzing of all transactional data. In some implementations, the actual market demand for a specific advertiser's coupon is inferred and/or derived from a related number of recorded transactions from the exchanging of coupons between consumers. In some implementations, the perceived market value of an advertiser's coupon in the minds of consumers is inferred and/or derived from a related number of recorded transactions from the exchanging of those coupons between consumers. In some implementations, the collectability of an advertiser's coupon in the minds of consumers is inferred and/or derived from a related number of recorded transactions from the exchanging of coupons between consumers. In some implementations, the quantifying of influence to invoke a consumer to take action resulting from any manipulation of a coupon's aspects is inferred and/or derived from a related number of recorded transactions from the exchanging of coupons between consumers. In some implementations, the platform provides the ability to score or rank variables tracked on the platform that can only be known by the monitoring of such transactions.

According to some implementations of the present disclosure, a method of managing coupons includes transmitting a plurality of coupons to a plurality of known consumers such that each of the plurality of known consumers is associated with a particular one of the plurality of coupons. The first consumer is permitted to offer a first one of the plurality of coupons that is associated with the first consumer for trade. The first consumer is permitted to search for a different coupon associated with a second consumer. Responsive to the first consumer trading the first coupon to the second consumer for the different coupon, a trade notification is transmitted.

According to some implementations of the present disclosure, a method of managing coupons includes determining a total coupon campaign amount to be issued via a plurality of coupons to a plurality of known consumers. The plurality of coupons is associated with a first party. A first portion of the plurality of known consumers is registered on a coupon trading platform and a second portion of the plurality of known consumers is not registered on the coupon trading platform. A face value for each of the plurality of coupons is determined. One of the plurality of coupons is transmitted to each of the plurality of known consumers such that each of the plurality of known consumers is associated with a particular one of the plurality of coupons. Responsive to a first one of the plurality of consumers being registered on the coupon trading platform, the first consumer is permitted to offer a first one of the plurality of coupons that is associated with the first consumer for trade via the coupon trading platform. Responsive to the first consumer being registered on the coupon trading platform, the first consumer is permitted to search for a second coupon to trade for the first coupon. The second coupon is associated with a second party that is different from the first party. Responsive to the first consumer trading the first coupon for the second coupon, a trade notification is transmitted to the first party. The trade notification includes information associated with (i) the first consumer, (ii) the first coupon, (iii) the second coupon, (iv) a second consumer associated with the second coupon, (v) a second party associated with the second coupon, (vi) or any combination thereof.

According to some implementations of the present disclosure, a method of identifying whether or not the current consumer who is registered to the coupon on the platform is already known by the advertiser and whether or not the current consumer who is registered to the coupon on the platform is a new unknown consumer by the advertiser. Since advertisers identify which consumers they distribute the coupons to originally on the platform, and consumers that obtain coupons on the coupon trading platform through trades with other consumers on the coupon trading platform are also registered, it can be determined whether or not a current consumer registered to the advertiser's coupon was part of the list of consumers that the advertiser distributed the coupons to originally.

According to some implementations of the present disclosure, a method includes transmitting a coupon to each of a first plurality consumers, each of the first plurality of consumers being associated with a first advertiser, permitting one or more of the first plurality of consumers to offer the coupon for trade, receiving trade information indicative of one or more trades of the coupon, and identifying one or more consumers previously unknown to the first advertiser based at least in part on the trade information.

According to some implementations of the present disclosure, a system includes a memory and a control system. The memory stores machine readable instruction and a database. The database includes information associated with (i) a plurality of coupons, (ii) a plurality of unique identifiers, each of the plurality of unique identifiers being associated with a corresponding one of a plurality of known consumers. The control system includes one or more processors. The control system is configured to execute the machine readable instructions to: determine a total coupon campaign amount to be issued via the plurality of coupons to the plurality of known consumers, the plurality of coupons being associated with a first party, a first portion of the plurality of known consumers being registered on a coupon trading platform and a second portion of the plurality of known consumers not being registered on the coupon trading platform, determine a face value for each of the plurality of coupons, transmit one of the plurality of coupons to each of the plurality of known consumers such that each of the plurality of known consumers is associated with a particular one of the plurality of coupons, responsive to a first one of the plurality of known consumers being registered on the coupon trading platform, permit the first consumer to offer a first one of the plurality of coupons that is associated with the first consumer for trade via the coupon trading platform, responsive to the first consumer being registered on the coupon trading platform, permit the first consumer to search for a second coupon to trade for the first coupon, the second coupon being associated with a second party that is different from the first party, and responsive to the first consumer trading the first coupon for the second coupon, transmit a trade notification to the first party, the trade notification including information associated with (i) the first consumer, (ii) the first coupon, (iii) the second coupon, (iv) a second consumer associated with the second coupon, (v) the second party associated with the second coupon, (vi) or any combination thereof.

The above summary is not intended to represent each embodiment or every aspect of the present invention. Additional features and benefits of the present invention are apparent from the detailed description and figures set forth below.

BRIEF DESCRIPTIONS OF DRAWINGS

The foregoing and other advantages of the present disclosure will become apparent upon reading the following detailed description and upon reference to the drawings.

Figure 1A:
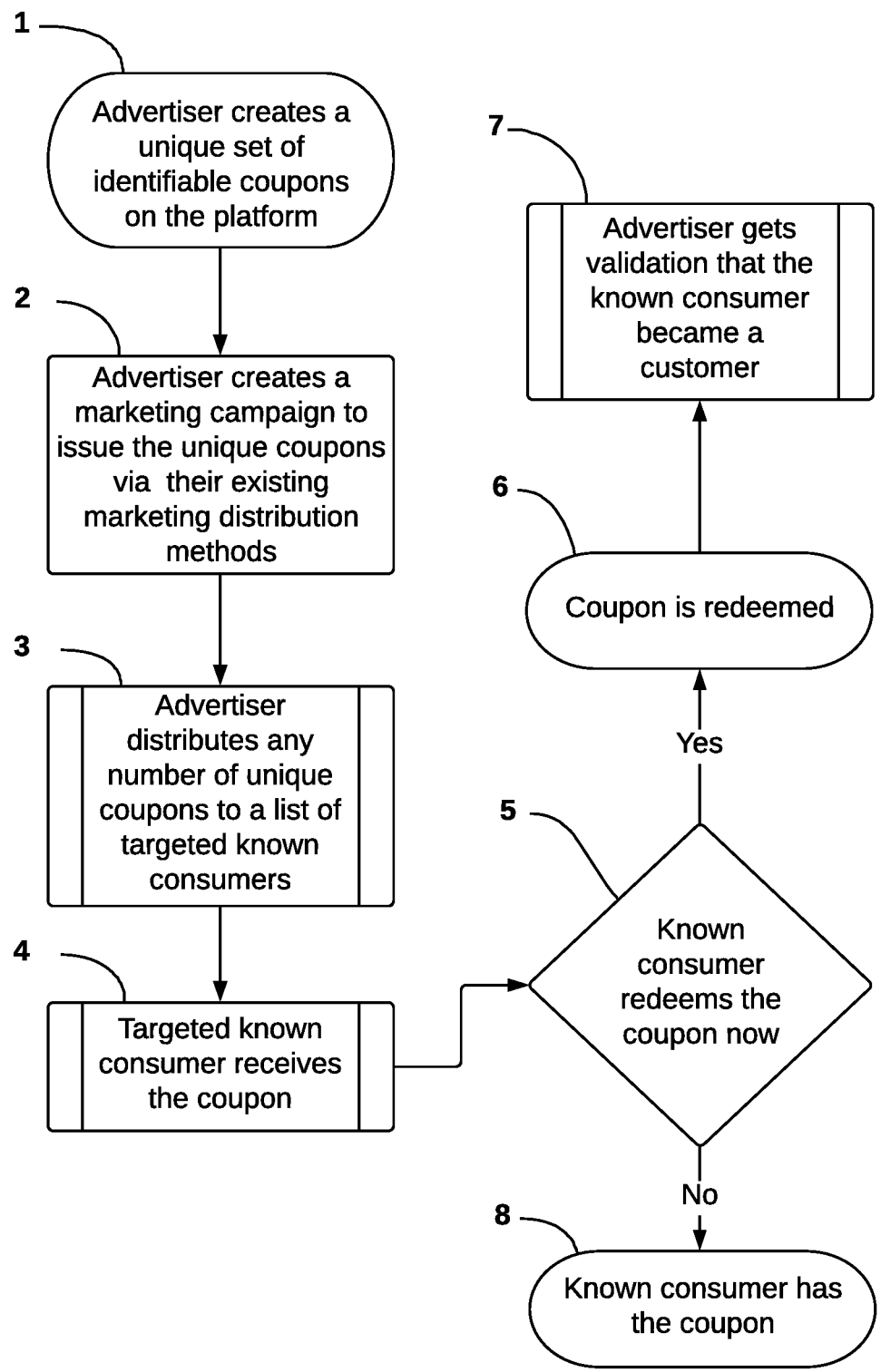
FIG. 1A is a first portion of a process flow diagram for a method of managing coupons, according to some implementations of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Referring generally to FIGS. 1A-1F, a decision process flow diagram is shown depicting interactions resulting from a consumer's actions with a coupon on a platform of the present disclosure.

First, in step 1, an advertiser creates a unique set of identifiable coupons on the platform. At step 2, the advertiser creates a marketing campaign to issue the unique coupons via one or more distribution methods. The unique coupons include, digital coupons, printed coupons, or both. Each coupon has one or more attributes, such as, for example, a face value, an expiration date, a permitted redemption location, a combination of couple rules, a description of an associated product or service, or any combination thereof. The distribution method can include any marketing distribution channel or format, such as, for example, email, mobile SMS, social media, software applications, print media with web links, etc., or any combination thereof.

Still referring to FIG. 1A, in step 3, the advertiser distributes any number of unique coupons (e.g., all of the unique coupons, a subset of the unique coupons, etc.) to a list of targeted known consumers that the advertiser wants to target for the marketing campaign. The advertiser can use any distribution method (e.g., email, mobile SMS, social media, software applications, print media with web links, etc., or any combination thereof) such that the unique coupon is distributed to a consumer (e.g., a consumer that is previously known to the advertiser).

Generally, a consumer is a person or individual who purchases goods and/or services. A consumer is a "known consumer" to the advertiser when the advertiser possesses information about the consumer prior to step 1, such as, for example, the consumer's name, address, email, shopping preferences, prior history with the store, etc., or any combination thereof. While a consumer may be a known consumer to advertiser, the consumer may not necessarily be a customer of the advertiser. As used herein, a customer refers to a consumer that previously purchased goods and/or services from the advertiser.

Still referring to FIG. 1A, at step 4, the known consumer(s) receives the coupon, and is regarded as the first consumer 41 (FIG. 2A) in the advertiser's transaction process which is described below in connection with FIG. 2A. A "targeted consumer" is a consumer that is subject to the advertiser's current marketing campaign (step 2).

Still referring to FIG. 1A, at step 5, the known consumer (step 4) chooses whether to redeem the coupon now. In some implementations, the consumer chooses to redeem the coupon, and the process proceeds to step 6. Then, at step 7, the advertiser receives a validation notification through the platform that the known consumer became a customer. If the known consumer decides not to redeem the coupon during step 5, the consumer retains possession of the coupon, and the process proceeds to step 8.

Figure 1B:
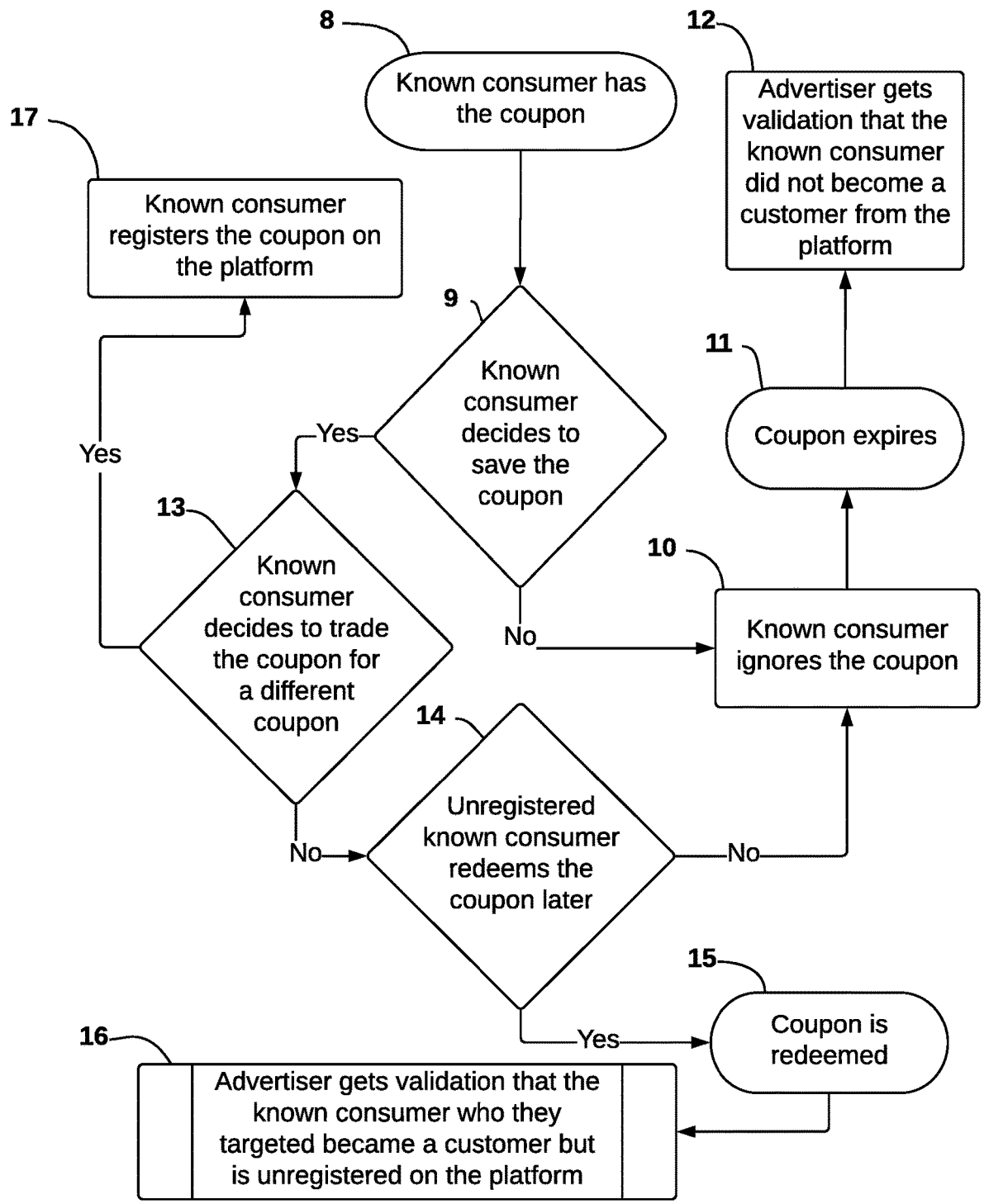
FIG. 1B is a second portion of a process flow diagram for a method of managing coupons, according to some implementations of the present disclosure.

Referring now to FIG. 1B, in implementations where the known consumer still has the coupon 8, the known customer decides whether to save or trade the coupon at step 9. If the known consumer decides not to save or trade the coupon at step 9, they essentially choose to ignore the coupon 10 and the coupon expires 11. When the known consumer lets the coupon expire at step 11, the advertiser receives a validation notification through the platform at step 12 indicating that the known consumer did not become a customer.

If the known consumer decides to save 9 or trade 13 the coupon, the known consumer is prompted to register the coupon on the platform at step 17. In some such implementations, registration is required to permit the consumer to save 9 or trade 13 the coupon. An unregistered known consumer who still has the coupon may choose to redeem the coupon later at step 14, in which case the coupon is redeemed at step 15 and the advertiser receives validation that the known consumer that they targeted became a customer, but did not register on the platform at step 16.

Still referring to FIG. 1B, whether or not the known consumer registers the coupon on the platform at step 17, the advertiser is still able to attribute any redemption 15 or expiration 11 of the coupon because the advertiser previously targeted that consumer during the original distribution (step 3) with a uniquely identifiable coupon. One difference with an unregistered known consumer's 14 coupon redemption 15, is that the advertiser receives a validation notification through the platform that the known consumer chose not to register the coupon on the platform, but still became a customer at step 16.

Figure 1C:
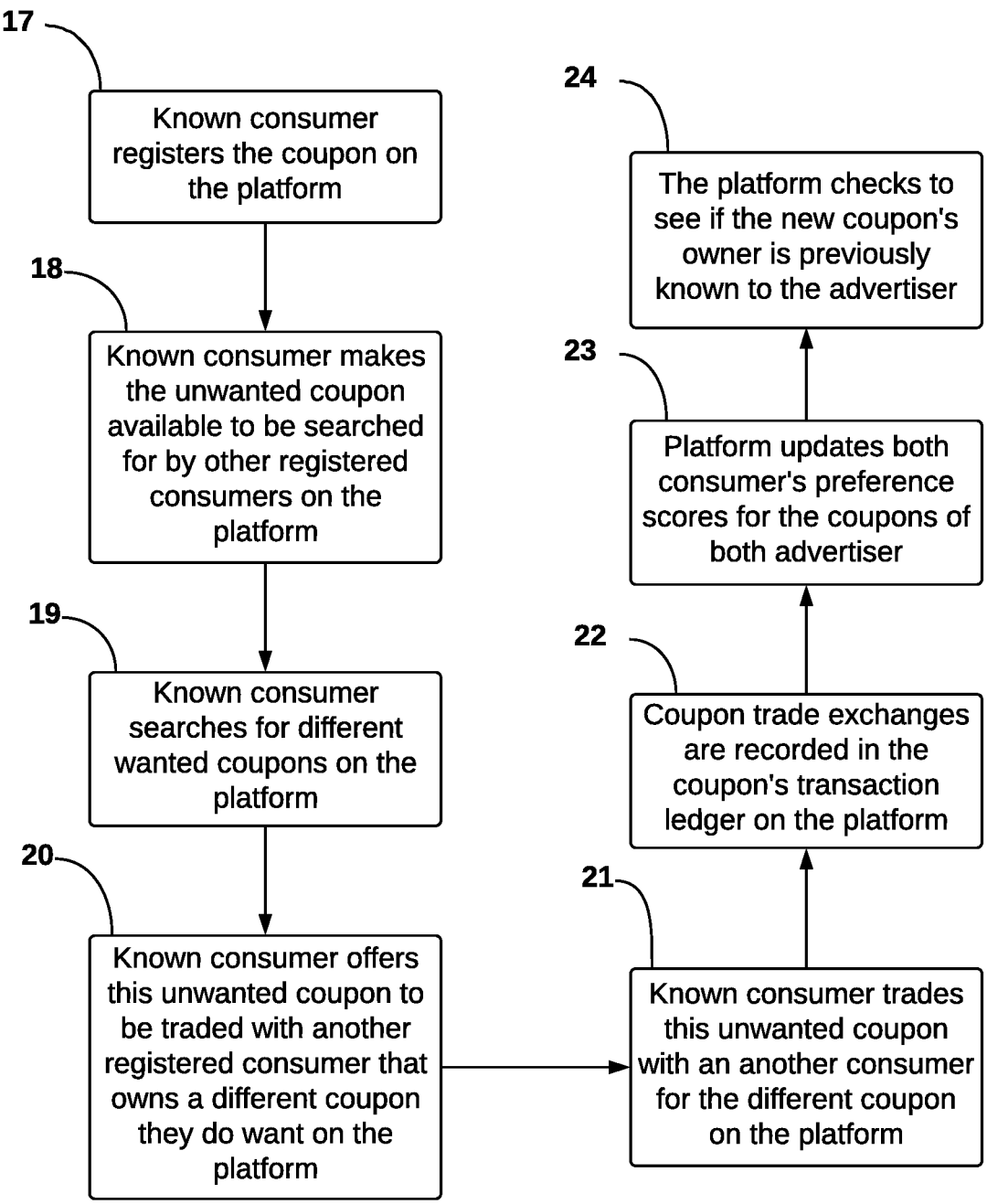
FIG. 1C is a third portion of a process flow diagram for a method of managing coupons, according to some implementations of the present disclosure.

Referring now to FIG. 1C, once a coupon is first registered on the platform at step 17, the known customer may make the coupon available to be searched for by other registered consumers on the platform 18 for trading purposes (e.g., if the consumer does not want to use the coupon). The known consumer can also search for other coupons on the platform at step 19 that the known customer does want. Also, the known consumer can offer their unwanted coupon to be traded with another registered consumer that owns a different coupon that the known consumer does want at step 20. If both registered consumers agree to the exchange, the known consumer trades the unwanted coupon with the other registered consumer for a different coupon on the platform at step 21. The coupon trade exchanges are recorded in a coupon transaction ledger maintained on the platform at step 22, and the platform updates both consumer's preference scores for the coupons of both advertisers at step 23. After a coupon is traded to a new owner/consumer, the platform also checks to see if the new owner is previously known to the advertiser at step 24.

Figure 1D:
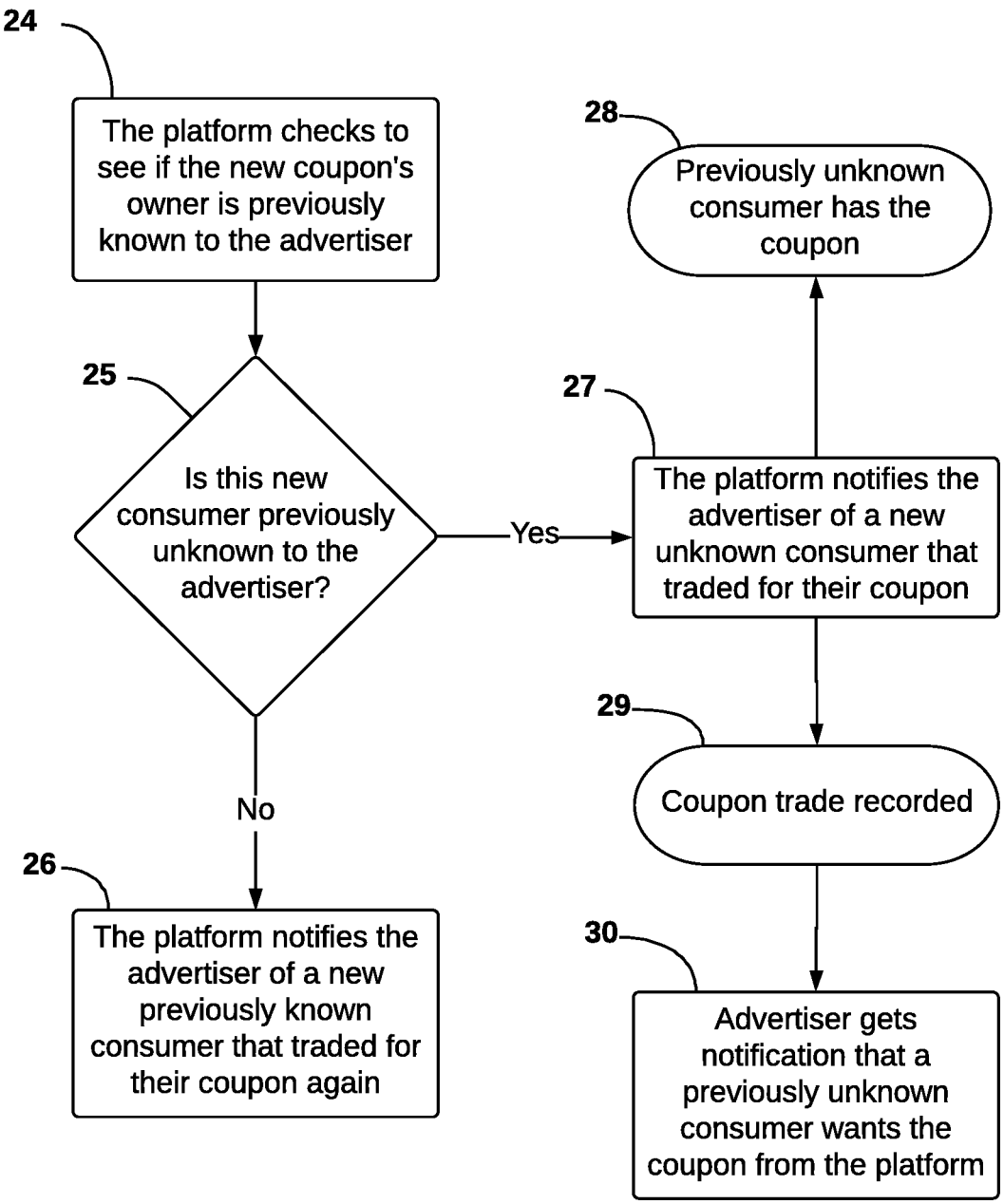
FIG. 1D is a fourth portion of a process flow diagram for a method of managing coupons, according to some implementations of the present disclosure.

Now referring to FIG. 1D, at step 24, the platform also checks to see if the new owner is previously known to the advertiser. If the new owner is already a consumer that is known to the advertiser, the platform notifies the advertiser that a new and/or different consumer, that was previously known to the advertiser, traded for their coupon again at step 26. If the new/different owner of the coupon is previously unknown to the advertiser, the platform notifies the advertiser that a new/different consumer, that was previously unknown to the advertiser, just traded for their coupon at step 27, and the coupon trade is recorded at step 29 on the platform, and the advertiser receives a notification that a previously unknown consumer wants the coupon from the platform at step 30. The new previously unknown consumer now possesses and can use the coupon 28.

Figure 1E:
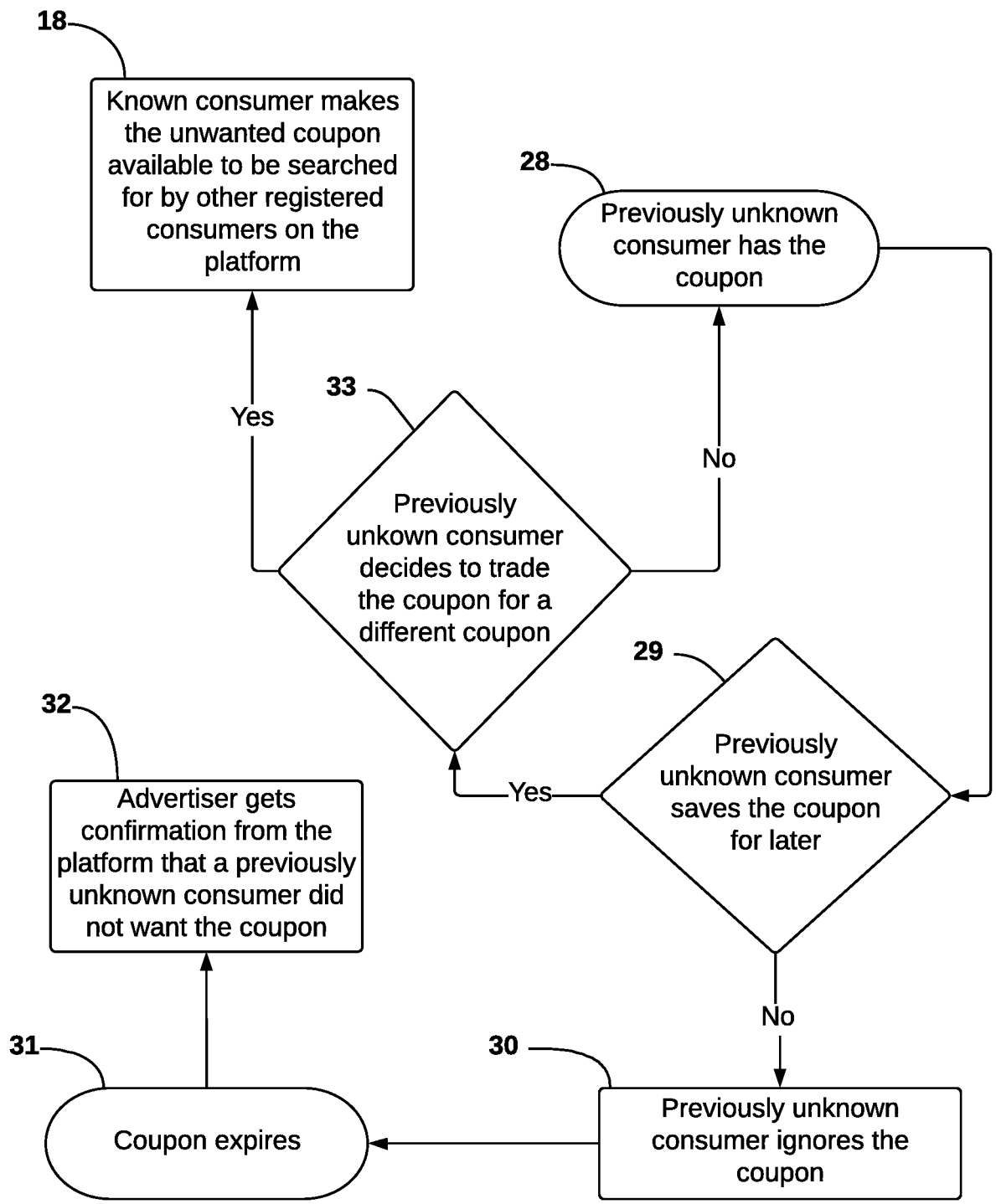
FIG. 1E is a fifth portion of a process flow diagram for a method of managing coupons, according to some implementations of the present disclosure.

Referring now to FIG. 1E, the current previously unknown consumer who now owns the advertiser's coupon (after receiving the coupon via trade) may choose to save the coupon at step 29 or trade the coupon away at step 33. If the current previously unknown consumer does decide to trade the coupon away at step 33, the previously unknown consumer is now a known consumer to the advertiser and the process flow is as described above where a known consumer makes the unwanted coupon available to be searched for by other registered consumers on the platform 18 (referenced in FIG. 1C and in FIG. 1E). If the current previously unknown consumer decides not to trade the coupon 33, the current previously unknown consumer still has the advertiser's coupon 28. If the previously unknown consumer decides not to save the coupon for later 29 and chooses to ignore the coupon 30, the coupon expires 31 and the advertiser gets confirmation from the platform that a previously unknown consumer did not want the coupon.

Figure 1F:
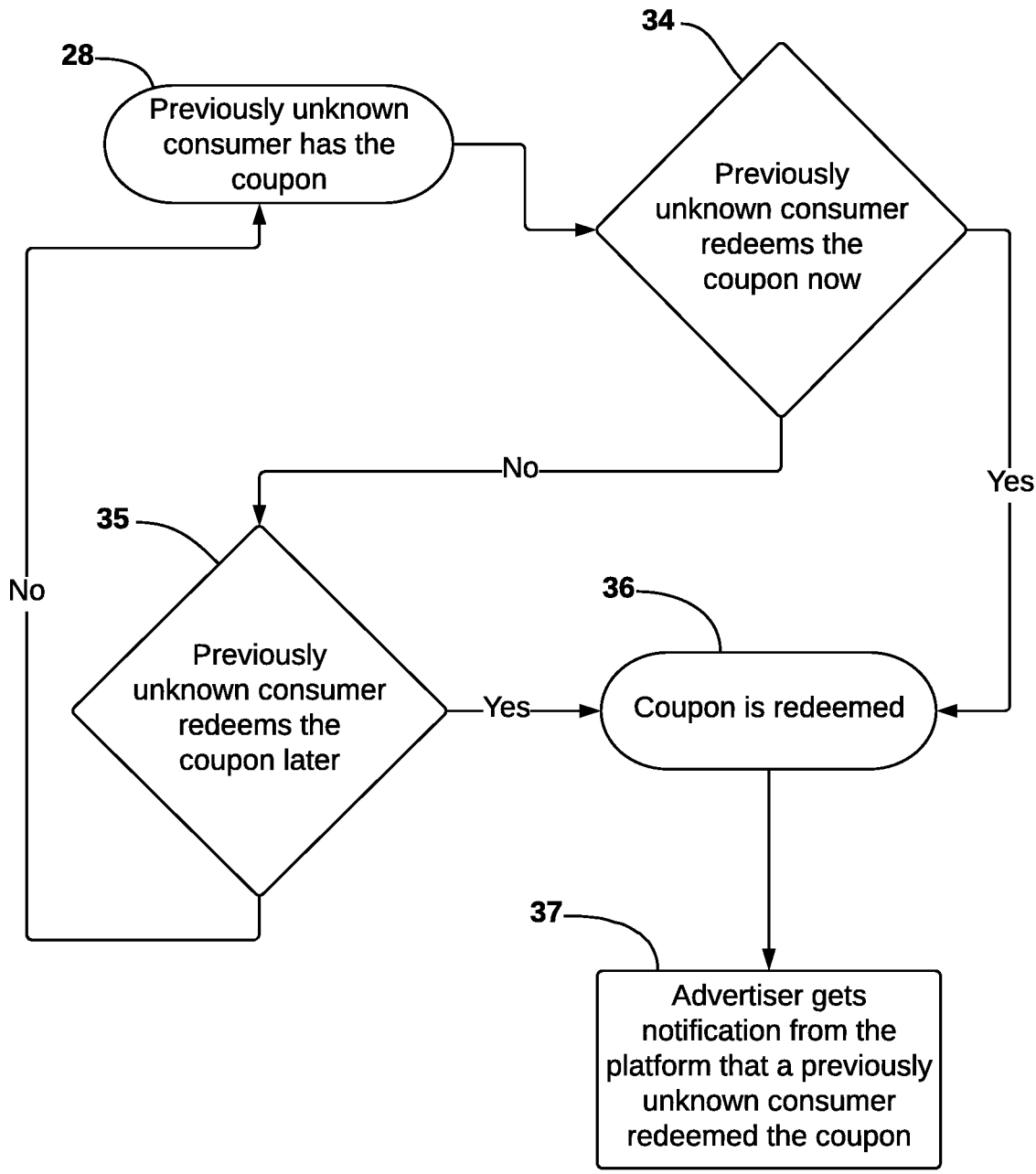
FIG. 1F is a sixth portion of a process flow diagram for a method of managing coupons, according to some implementations of the present disclosure.

Referring now to FIG. 1F, the current previously unknown consumer still has the coupon 28 and may choose to redeem the coupon now 34 or later 35. If the current previously unknown consumer redeems the coupon now 34 or later 35, the coupon is redeemed 36 and the advertiser gets a notification from the platform that a previously unknown consumer redeemed the coupon.

Referring back to FIG. 1E, the current previously unknown consumer can decide to save 29 or trade 33 the coupon again, if they have not redeemed it and it has not expired.

Referring generally to FIGS. 2A-2H, a process flow diagram is shown depicting various platform transactions from a perspective of an advertiser. Step 38 is the same as, or similar to, step 2 (FIG. 1A) described above and includes creating a unique set of identifiable coupons on the platform. At step 39, the platform also sets a market value of each coupon based at least in part on the face value of the coupon.

Step 40 is the same as, or similar to, step 3 (FIG. 1A) described above and includes sending the coupons to known targeted consumers. Step 41 is the same as, or similar to, step 4 (FIG. 1A) described above include that a targeted known consumer receives one or more coupons. More specifically, in step 41, a first consumer receives the coupon. As described herein, the advertiser can track a number of consumers (e.g., the first consumer) that interacts with the same unique coupon during the lifecycle of the coupon.

Figure 2A:
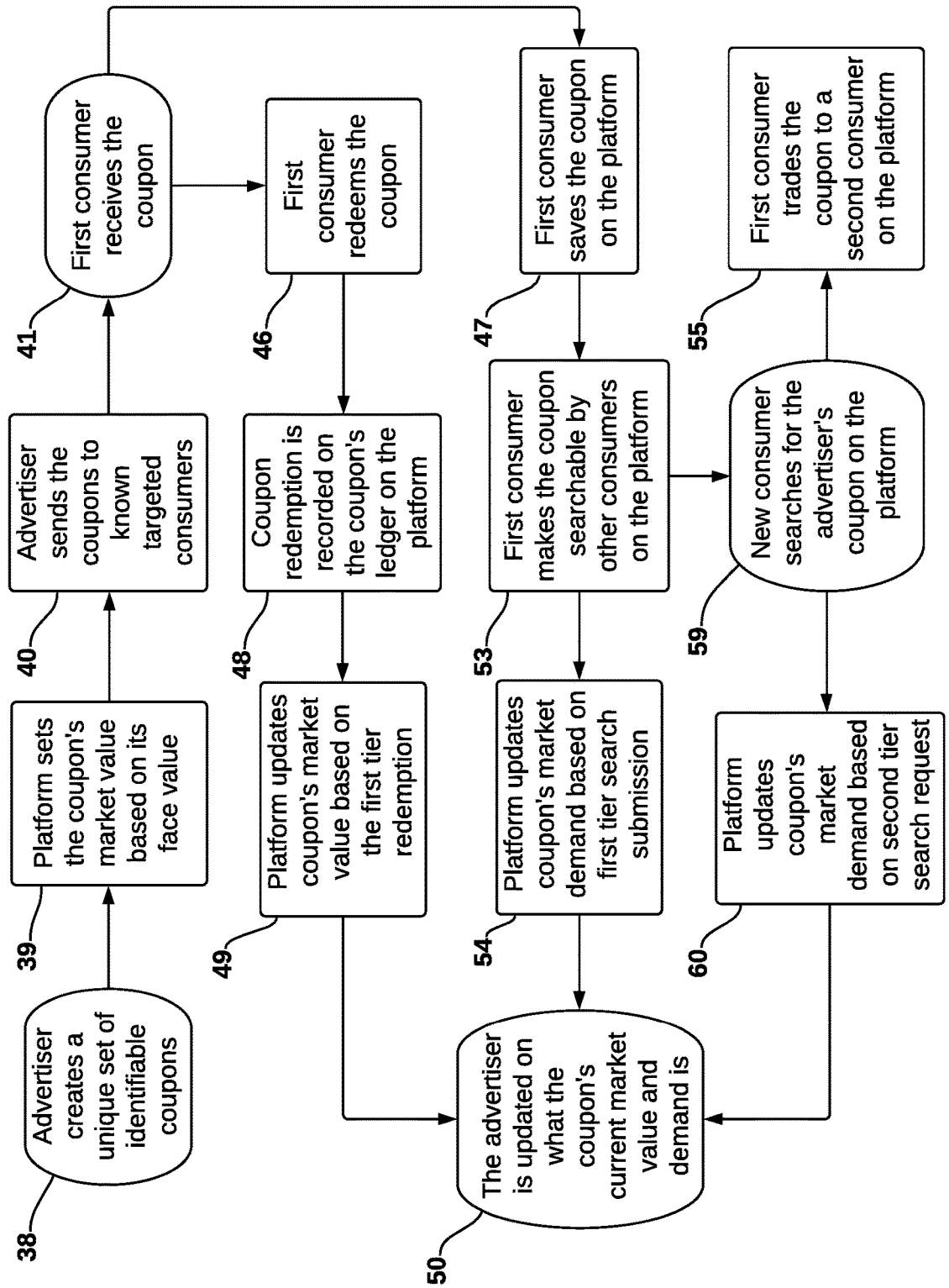
FIG. 2A is a first portion of a process flow diagram for a method of managing coupons, according to some implementations of the present disclosure.

Referring to FIG. 2A, when the first consumer receives the coupon at step 41, the first consumer can choose whether to redeem the coupon (step 46) or save the coupon on the platform (step 47) for later usage or trading. Should the first consumer redeem the coupon at step 46, information indicative of the coupon redemption is recorded in the coupon ledger on the platform at step 48. The platform then updates the market value of the coupon based on a first tier redemption at step 49, and the advertiser receives information associated with the updated current market value of the coupon at step 50.

Figure 2B:
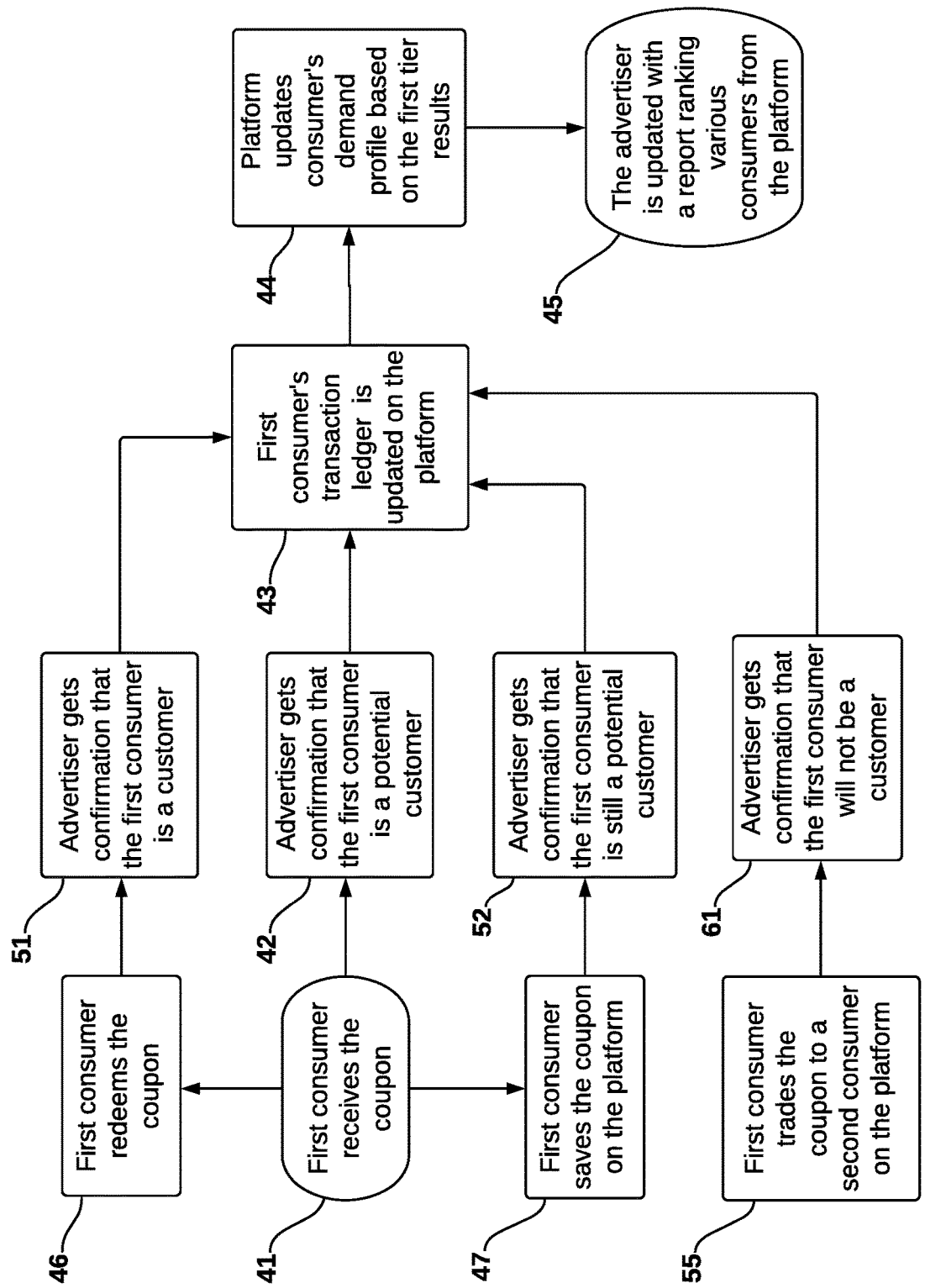
FIG. 2B is a second portion of a process flow diagram for a method of managing coupons, according to some implementations of the present disclosure.

Now referring to FIG. 2B, when the first consumer redeems the coupon at step 46, the advertiser receives confirmation that the first consumer is now a customer of the advertiser at step 51. A transaction ledger associated with the first consumer is updated on the platform at step 43, and the platform will also update a demand profile associated with the first based at least in part on first tier results of this transaction and at step 44, and the advertiser receives an update with a current report at step 45. The current report ranks the various consumers from the platform that may have interacted with their coupon.

Still referring to FIG. 2B, when the first consumer receives the coupon at step 41, the advertiser receives confirmation that the first consumer is a potential customer at step 42. The transaction ledger associated with the first consumer is updated on the platform at step 43 to reflect that the first consumer is a potential customer (step 42). Following step 43, the platform then updates the demand profile associated with the first consumer based at least in part on the first tier results (step 44) of the transaction. The advertiser is also updated with a current report ranking the various consumers from the platform (step 45) that may have interacted with their coupon.

Still referring to FIG. 2B, if the first consumer saves the coupon on the platform (step 47), the advertiser receives confirmation that the first consumer is still a potential customer at step 52. The transaction ledge associated with the first consumer is then updated on the platform at step 43. The platform then updates the demand profile associated with the first consumer based at least in part on the first tier results (step 44) of the transaction. The advertiser is also updated with a current report ranking the various consumers from the platform (step 45) that may have interacted with their coupon.

Referring back to FIG. 2A, when the first consumer saves the coupon on the platform (step 47), the first consumer has the ability to trade that coupon for other coupons on the platform. Since all registered coupons are initially private and only viewable to the consumer that registered it on the platform, the first consumer needs to make the coupon searchable by other consumers on the platform (step 53) if they want to trade that coupon. This action triggers the platform to update the coupon's market demand based on the first tier search submission (step 54) and the advertiser receives information indicative of the updated current market demand of the coupon (step 50). All coupons available for trade on the platform are searchable to any other consumers interested in trading coupons, but those coupons are still subject to expiring if they are not redeemed by any consumer prior to their expiration date. Alternatively, in some implementations, only a portion of the coupons available to trade are searchable by a specific consumer. For example, coupons may be limited geographically and as such, coupons outside the geographic scope of a specific consumer (e.g., city, town, state, region, etc.) would not be searchable.

Still referring to FIG. 2A, when another new consumer searches for an advertiser's coupon on the platform (step 59), the platform updates the market demand for the coupon based at least in part on a second tier search request (step 60) and the advertiser receives the updated current market demand of the coupon (step 50). Additionally, when another new consumer searches for an advertiser's coupon on the platform (step 59), it is possible that the first consumer trades the coupon to a second consumer on the platform (step 55).

Referring back to FIG. 2B, when the first consumer trades the coupon to a second consumer on the platform (step 55), the advertiser receives confirmation that the first consumer will not be a customer of the advertiser (step 61). The transaction ledger associated with the first consumer is updated on the platform (step 43), and the platform updates the consumer's demand profile based on the first tier results (step 44) of this transaction. The advertiser is also updated with a current report ranking the various consumers from the platform (step 45) that may have interacted with their coupon.

The reference to first tier above generally refers to the first consumer's handling of the coupon during the life of the coupon, whereas references to second tier below generally refer to a second consumer's handling of the coupon after receiving ownership of the coupon from the first consumer (e.g., via a trade 55 in FIGS. 2A and 2B). Stated another way, use of the term "tier" herein aids in differentiating levels of awareness for an advertiser (e.g., an issuer of a coupon of interest). When an advertiser initially issues a coupon, the advertiser is aware of all known consumers in the first tier because the advertiser directly targeted those consumers (e.g., sent the coupon directly to the first tier consumers). However, once a coupon is traded to a second consumer, the second tier begins. The second tier of consumers may include consumers that were previously unknown to the advertiser. Thus, knowledge of the second tier of consumers is beneficial to the advertiser by increasing the advertiser's consumer base. Similarly, the second tier of consumers may include consumers that were already known to the advertiser. Thus, knowledge of the second tier of consumers is beneficial to the advertiser by indicating that known consumers are very interested in the coupon and likely to be a purchaser (e.g., customer of the advertiser's goods and/or services). Because multiple trades can occur within the lifecycle of a coupon, additional tiers (e.g., third, fourth, fifth, etc.) are references herein that can aid in a further expansion of awareness for the advertiser. The tiers are similar to a "six degrees of separation" analysis where unknown consumers to an advertiser make themselves known to the advertiser because they performed an action (e.g., a trade for their coupon) that identified the unknown consumer to the advertiser. Further, as the system and/or platform of the present disclosure tracks which tier (or which trade in the sequence of the transaction history of the coupon) the consumer acted within, the system is able to infer additional information about that new/different consumer based on demographics, trade information, etc.

Figure 2C:
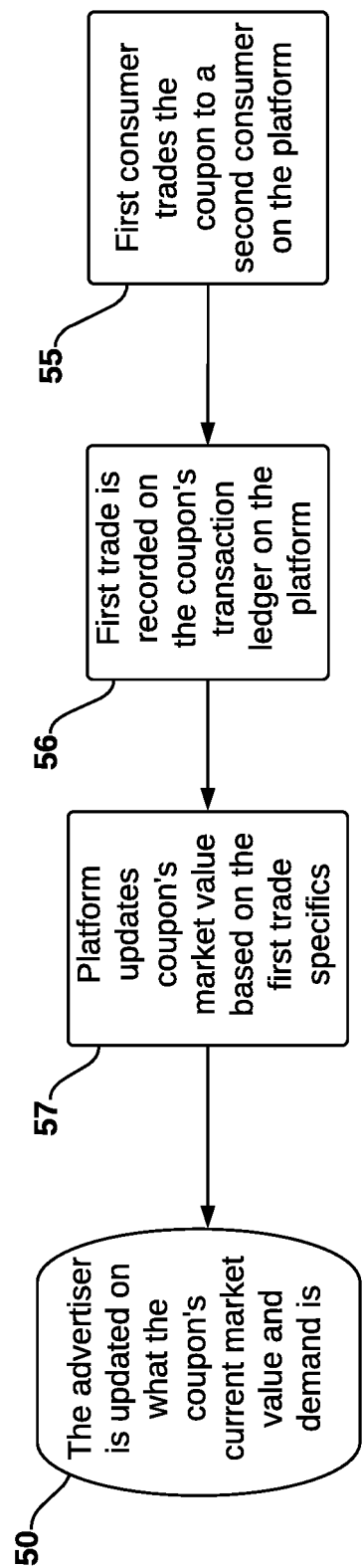
FIG. 2C is a third portion of a process flow diagram for a method of managing coupons, according to some implementations of the present disclosure.

Now referring to FIG. 2C, if the first consumer trades the coupon to a second consumer on the platform (step 55), the trade is recorded on the transaction ledger associated with the coupon on the platform (step 56). The platform then updates the market value associated with the coupon based at least in part on first trade specifics (step 57). The advertiser also receives information indicative of the updated market value of the coupon (step 50).

Figure 2D:
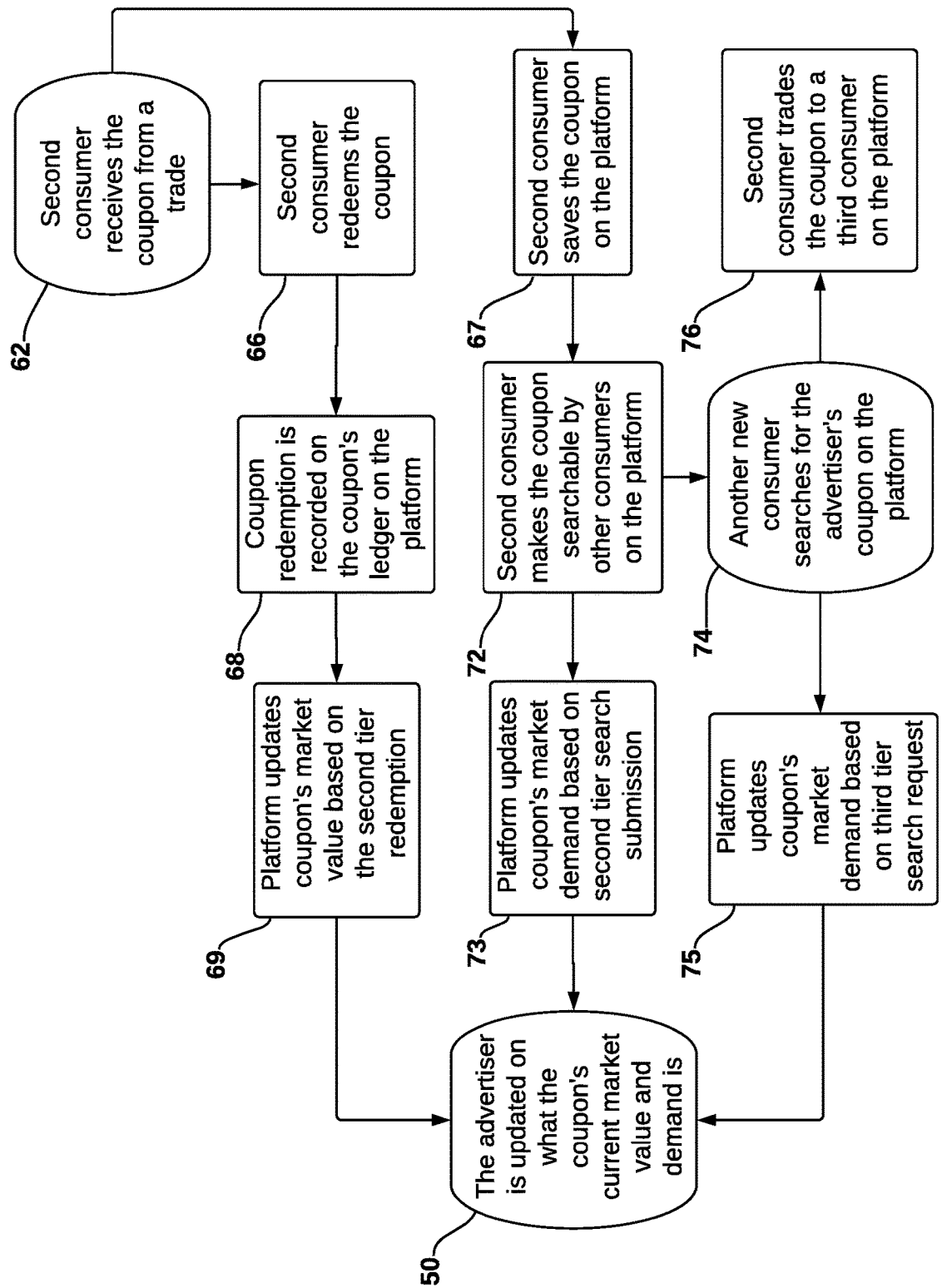
FIG. 2D is a fourth portion of a process flow diagram for a method of managing coupons, according to some implementations of the present disclosure.

Referring now to FIG. 2D, when the second consumer receives the coupon from a trade at step 62, the second consumer has the option of redeeming the coupon (step 66) or saving the coupon on the platform (step 67). Should the second consumer redeem the coupon (step 66), the coupon redemption is recorded in the coupon ledger on the platform 68. The platform then updates the market value of the coupon based at least in part on the second tier redemption at step 69. The advertiser receives information indicative of the updated current market value of the coupon (step 50).

Still referring to FIG. 2D, if the second consumer saved the coupon on the platform (step 67), the second consumer has the ability to also trade that coupon for other coupons on the platform. As registered coupons are initially private and only viewable to the consumer that registered it on the platform, the second consumer needs to make the coupon searchable by other consumers on the platform (step 72) if the second consumer wants to trade the coupon. The making of the coupon searchable triggers the platform to update the market demand of the coupon based at least in part on the second tier search submission (step 73) and the advertiser is updated on what the current market demand of the coupon (step 50). As noted above, in some implementations of the present disclosure, all coupons available for trade on the platform are searchable to any other consumers interested in trading coupons, but those coupons are still subject to expire if they are not redeemed prior to their expiration date.

Still referring to FIG. 2D, when another new consumer searches for an advertiser's coupon on the platform (step 74), the platform updates the market value of the coupon based at least in part on a third tier search request (step 75), and the advertiser receives information indicative of the updated current market value of the coupon (step 50). Additionally, when another new consumer searches for an advertiser's coupon on the platform (step 74), it is possible that the second consumer trades the coupon to a third consumer on the platform (step 76).

Figure 2E:
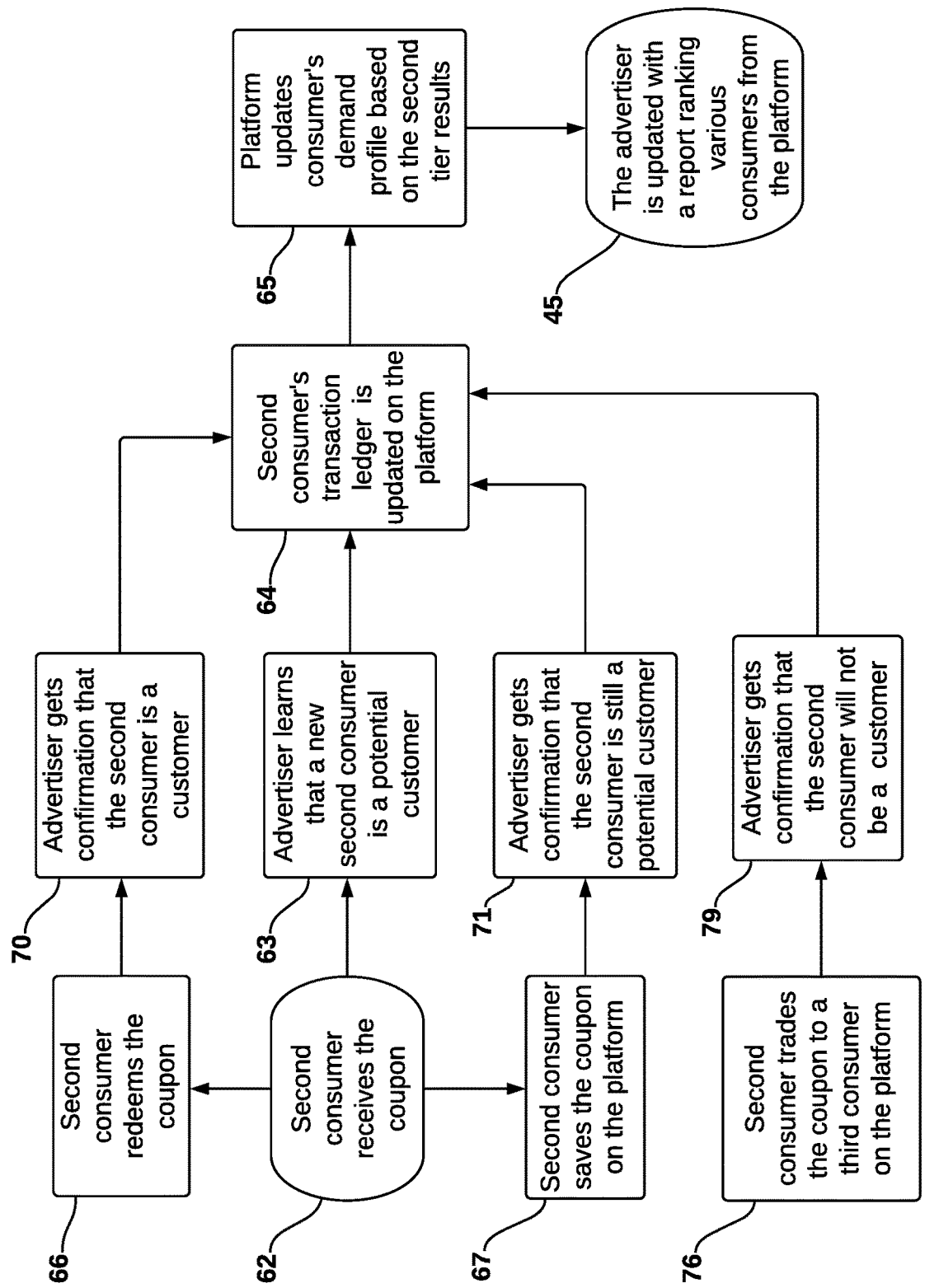
FIG. 2E is a fifth portion of a process flow diagram for a method of managing coupons, according to some implementations of the present disclosure.

Referring now to FIG. 2E, if the second consumer redeems the coupon (step 66), the advertiser receives confirmation that the second consumer is now a customer (step 70). The transaction log associated with the second consumer is updated on the platform (step 64), and the platform also updates the demand profile associated with the second consumer based at least in part on the second tier results (step 65) of this transaction. The advertiser also receives an updated current report ranking the various consumers from the platform (step 45) that may have interacted with their coupon.

Still referring to FIG. 2E, when the second consumer receives the coupon (step 62), the advertiser receives information indicating that the second consumer is a potential new customer (step 63). A transaction ledge associated with the second consumer updated on the platform (step 64). At step 65, the platform also updates a demand profile associated with the second consumer based at least in part on the second tier results of this transaction. At step 45, the advertiser receives an updated current report ranking the various consumers from the platform that may have interacted with their coupon.

Still referring to FIG. 2E, if the second consumer saves the coupon on the platform (step 67), the advertiser receives confirmation that the second consumer is still a potential customer at step 71. The transaction ledge associated with the second consumer is updated on the platform (step 64). The platform updates the demand profile associated with the second consumer based at least in part on the second tier results (step 65) of this transaction. The advertiser also receives an updated current report ranking the various consumers from the platform (step 45) that may have interacted with their coupon.

Referring back to FIG. 2E, when the second consumer trades the coupon to a third consumer on the platform (step 76), the advertiser receives confirmation that the second consumer will not be a customer at step 79. The transaction ledger associated with the second consumer is updated on the platform (step 64). The platform will also update the demand profile associated with the second consumer based at least in part on the second tier results (step 65) of this transaction. The advertiser also receives an updated current report ranking the various consumers from the platform (step 45) that may have interacted with their coupon.

Figure 2F:
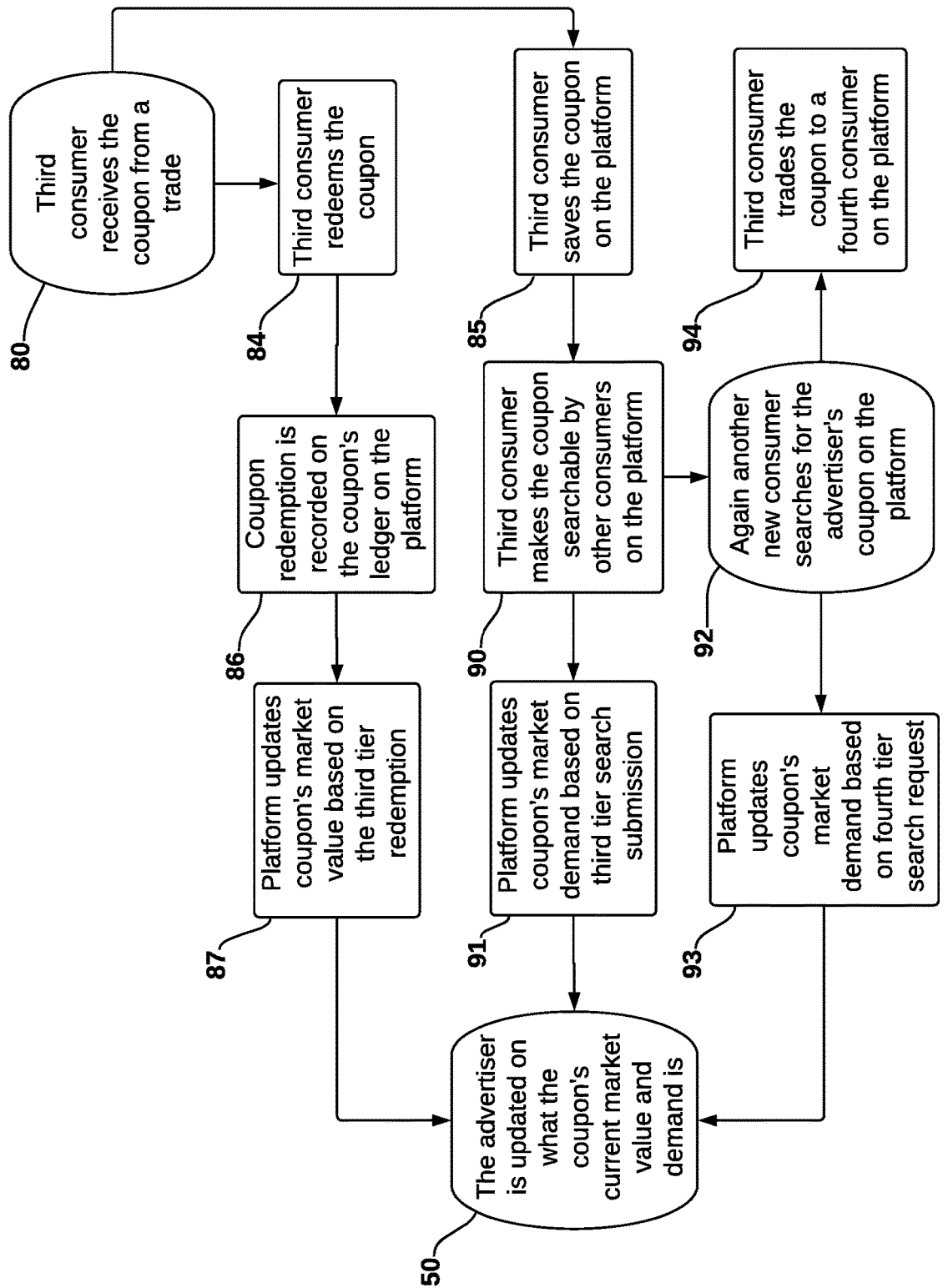
FIG. 2F is a sixth portion of a process flow diagram for a method of managing coupons, according to some implementations of the present disclosure.

Referring now to FIG. 2F, when the third consumer receives the coupon from a trade 80, the third consumer has the option of redeeming the coupon (step 84) or saving the coupon on the platform (step 85). Should the third consumer redeem the coupon (step 84), information indicative of the coupon redemption is recorded in the coupon ledger on the platform at step 86. The platform then updates the coupon's market value based on the third tier redemption 87 and the advertiser is updated on what the coupon's current market value is 50.

Still referring to FIG. 2F, if the third consumer saved the coupon on the platform 85, the third consumer has the ability to also trade that coupon for other coupons on the platform. As registered coupons are initially private and only viewable to the consumer that registered the coupon on the platform, the third consumer needs to make the coupon searchable by other consumers on the platform 90 if the third consumer wants to trade the coupon. The making of the coupon searchable triggers the platform to update the market demand of the coupon based on the third tier search submission 91 and the advertiser is updated on what the coupon's current market demand is 50. As noted above, in some implementations of the present disclosure, all coupons available for trade on the platform are searchable to any other consumers interested in trading coupons, but those coupons are still subject to expire if they are not redeemed prior to their expiration date.

Still referring to FIG. 2F, if again another new consumer searches for an advertiser's coupon on the platform 92, the platform updates the market demand of the coupon based on a fourth tier search request 93 and the advertiser receives information indicative of the updated current market demand (step 50).

Figure 2G:
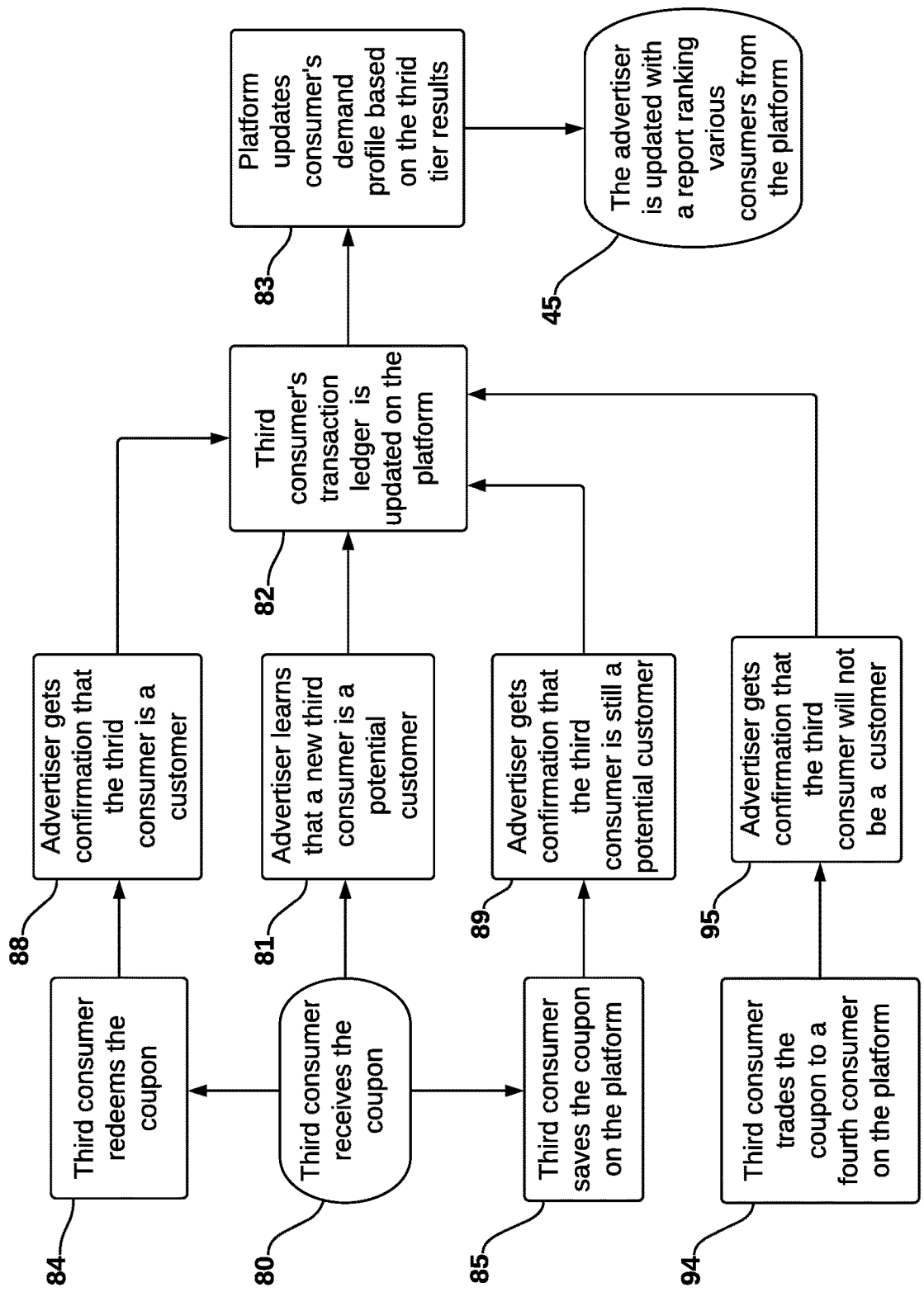
FIG. 2G is a seventh portion of a process flow diagram for a method of managing coupons, according to some implementations of the present disclosure.

Referring now to FIG. 2G, when the third consumer redeems the coupon 84, the advertiser gets confirmation that the third consumer is a customer 88. The third consumer's transaction ledger is updated on the platform 82 and the platform will also update the consumer's demand profile based on the third tier results 83 of this transaction and the advertiser is also updated with a current report ranking the various consumers from the platform 45 that may have interacted with their coupon.

Still referring to FIG. 2G, when the third consumer receives the coupon (step 80), the advertiser learns that a new third consumer is a potential customer 81. The third consumer's transaction ledger is updated on the platform (step 82) and the platform updates the consumer's demand profile based on the third tier results (step 83) of this transaction and the advertiser is also updated with a current report ranking the various consumers from the platform 45 that may have interacted with their coupon. Additionally, if the third consumer saves the coupon on the platform (step 85), the advertiser receives confirmation that the third consumer is still a potential customer 89. The transaction ledger associated with the third consumer is updated on the platform (step 82) and the platform updates the demand profile associated with the third consumer based at least in part on the third tier results 83 of this transaction. The advertiser is also updated with a current report ranking the various consumers from the platform 45 that may have interacted with their coupon.

Still referring to FIG. 2G, if the third consumer trades the coupon to a fourth consumer on the platform 94, the advertiser gets confirmation that the third consumer will not be a customer 95. The third consumer's transaction ledger is updated on the platform 82 and the platform updates the consumer's demand profile based on the third tier results 83 of the transaction and the advertiser is also updated with a current report ranking the various consumers from the platform 45 that may have interacted with their coupon.

Figure 2H:
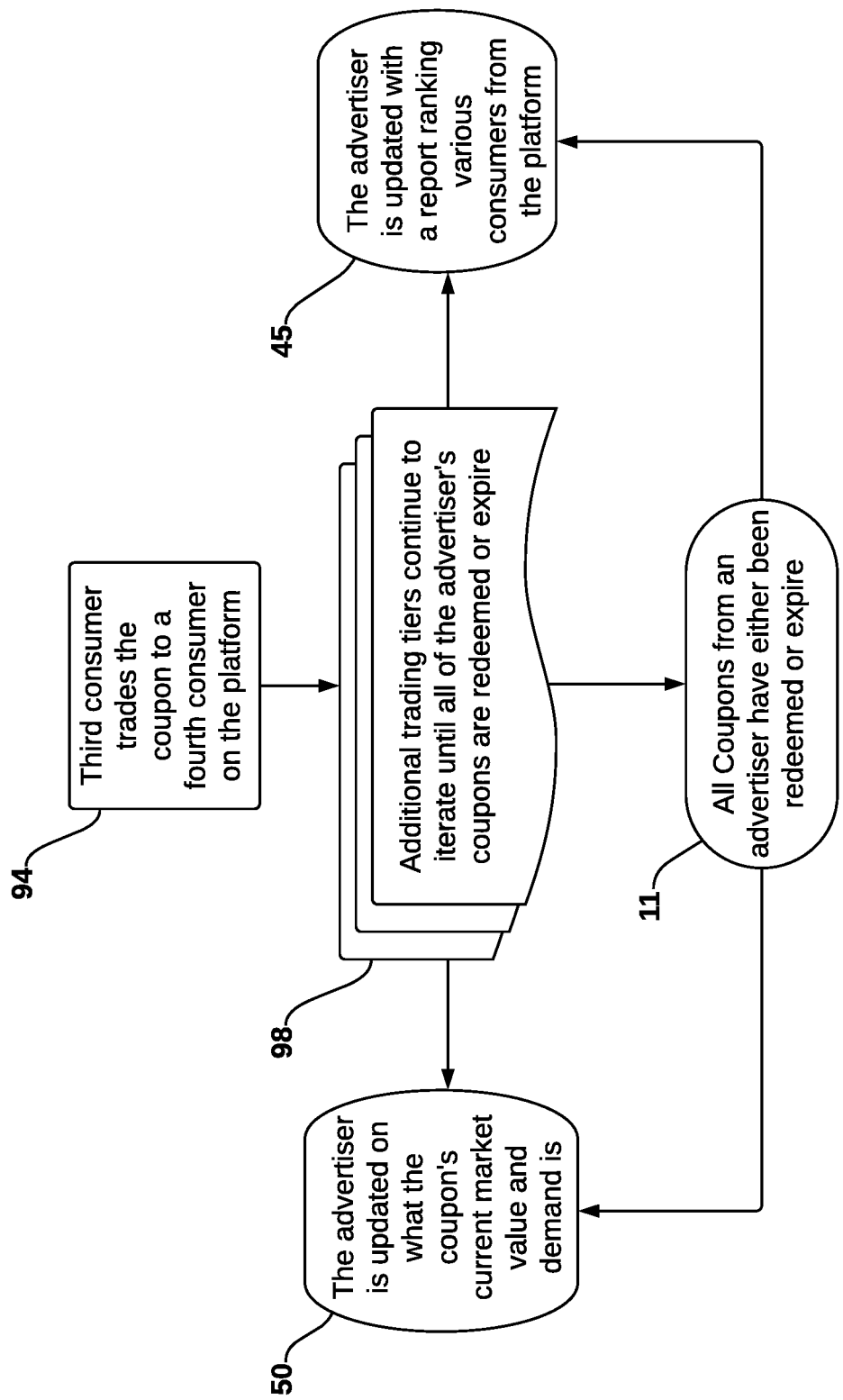
FIG. 2H is an eighth portion of a process flow diagram for a method of managing coupons, according to some implementations of the present disclosure.

Referring now to FIG. 2H, when a third consumer trades the coupon to a fourth consumer on the platform (step 94), additional coupon trading tiers can continue to iterate until all of the advertiser's coupons are redeemed and/or expire (step 98). Each additional coupon trading tier transaction continues to update the advertiser on what the current market value and demand of the coupon (step 50). The advertiser is also updated with a report ranking various consumers from the platform (step 45) that may have interacted with the coupon the advertiser issued. The additional coupon trading tier transactions can continue until all the coupons from an advertiser have either been redeemed or expire (step 11).

Figure 3A:
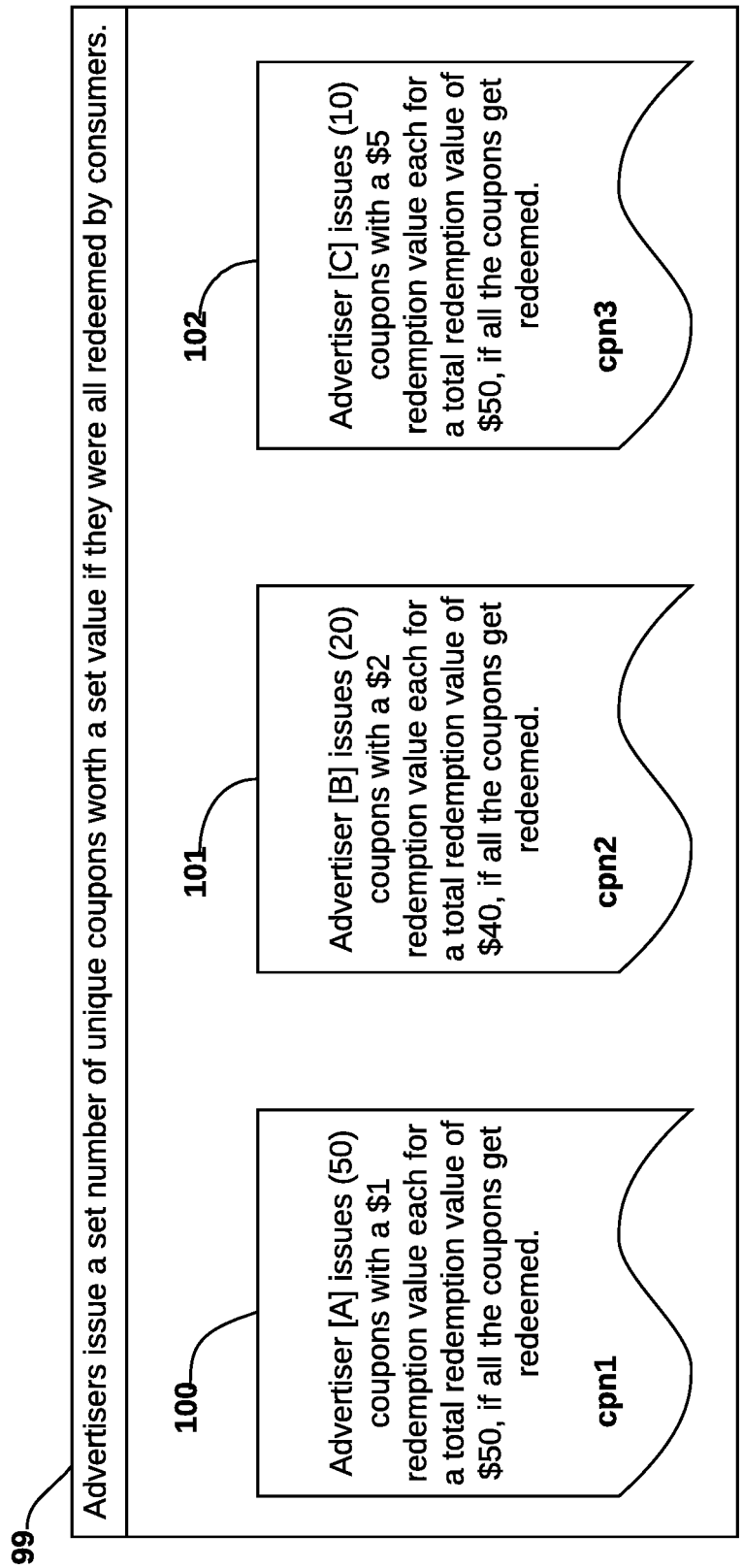
FIG. 3A is a schematic illustration for issuing a plurality of unique coupons having a predetermined value upon redemption by consumers, according to some implementations of the present disclosure.
Figure 3B:
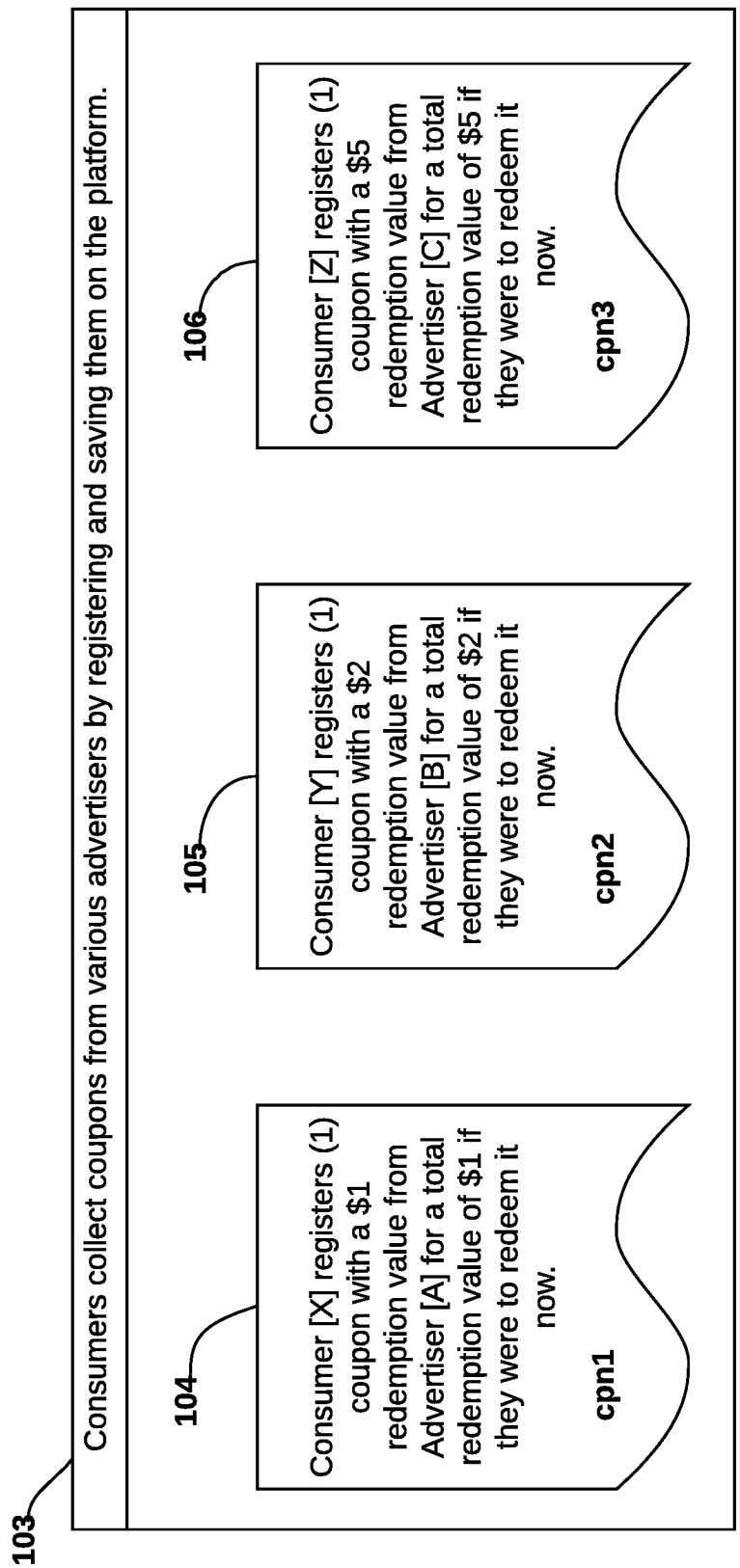
FIG. 3B is a schematic illustration for registering and saving one or more coupons on a platform, according to some implementations of the present disclosure.
Figure 3C:
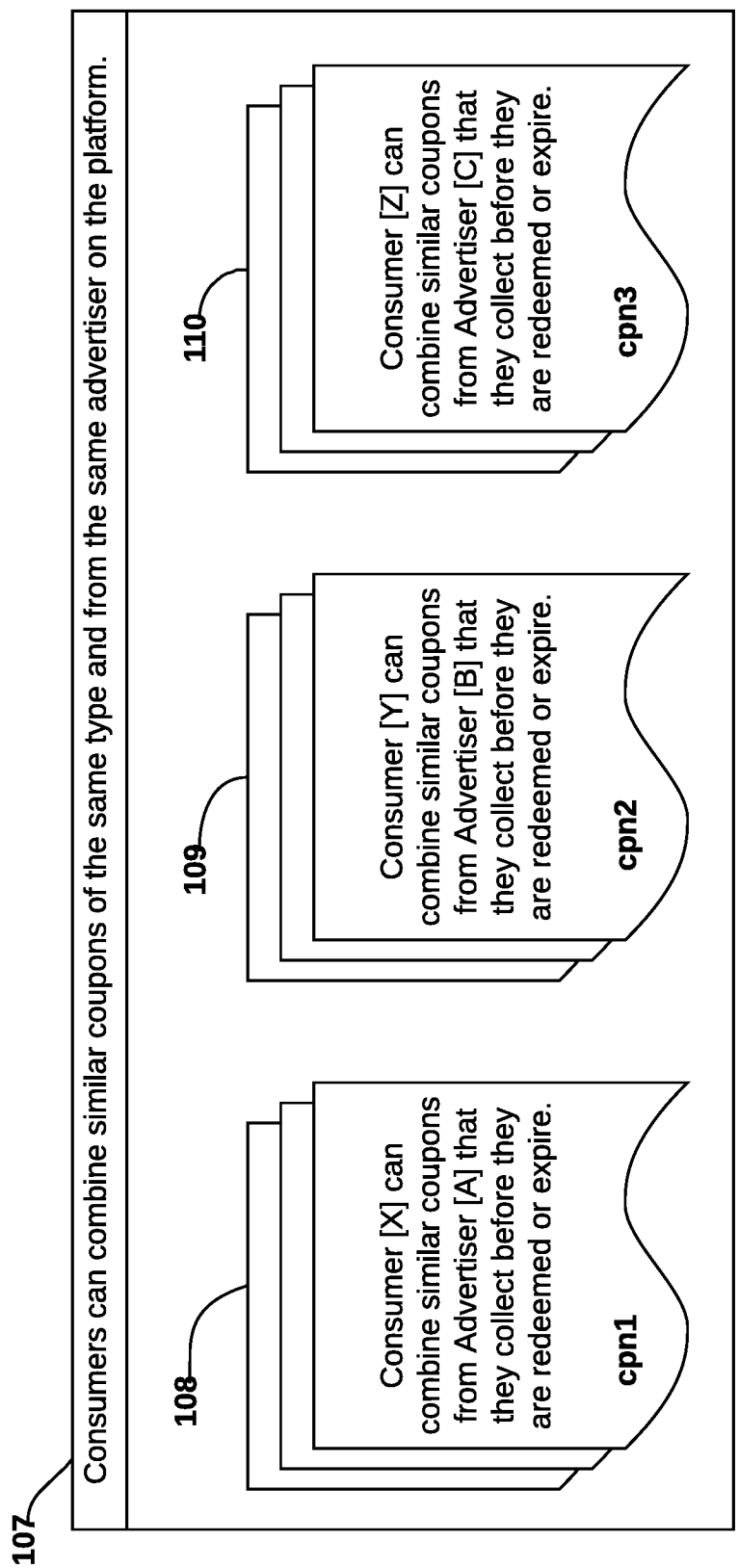
FIG. 3C is a schematic illustration for combining one or more coupons on the platform, according to some implementations of the present disclosure.
Figure 3D:
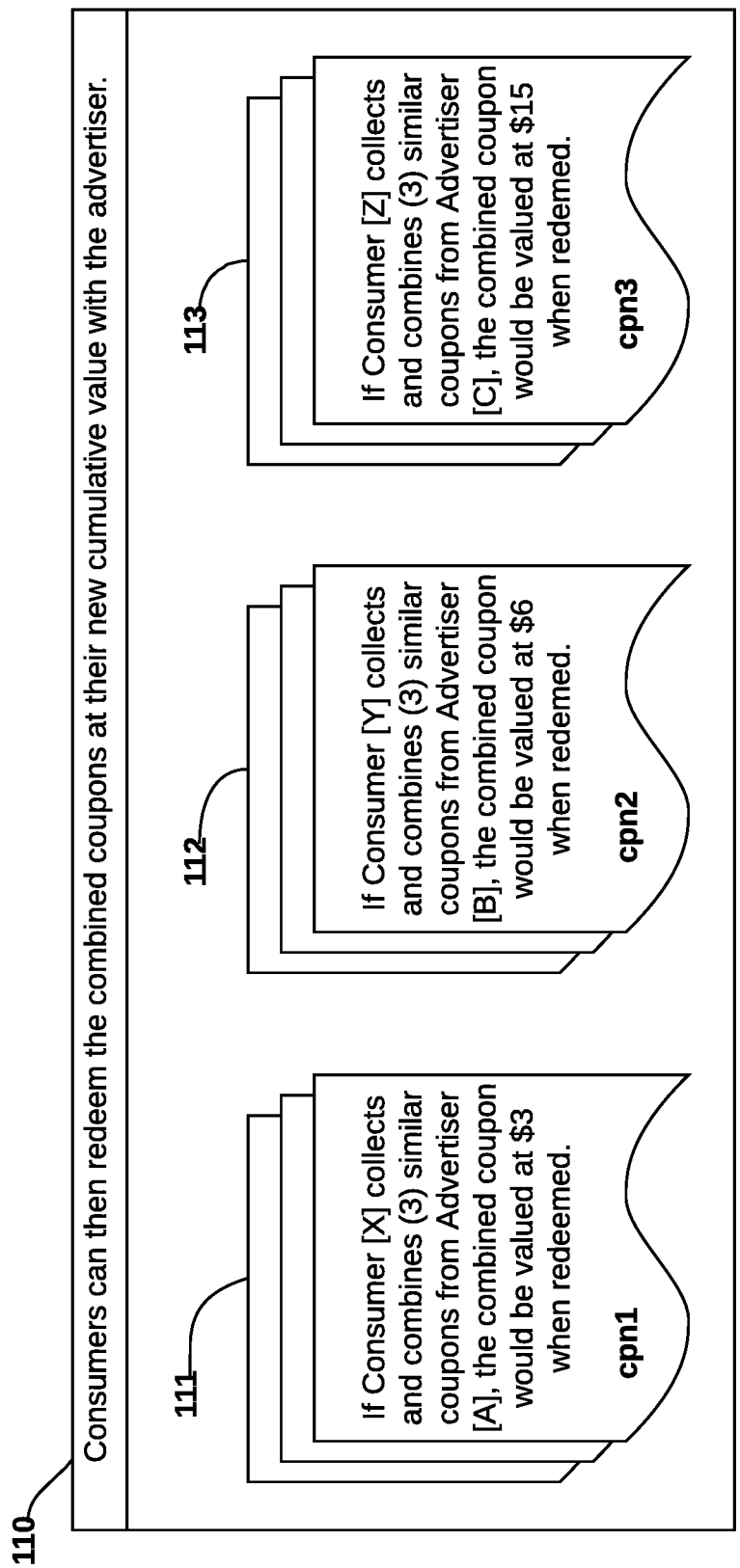
FIG. 3D is a schematic illustration for redeeming the one or more coupons, according to some implementations of the present disclosure.
Figure 3E:
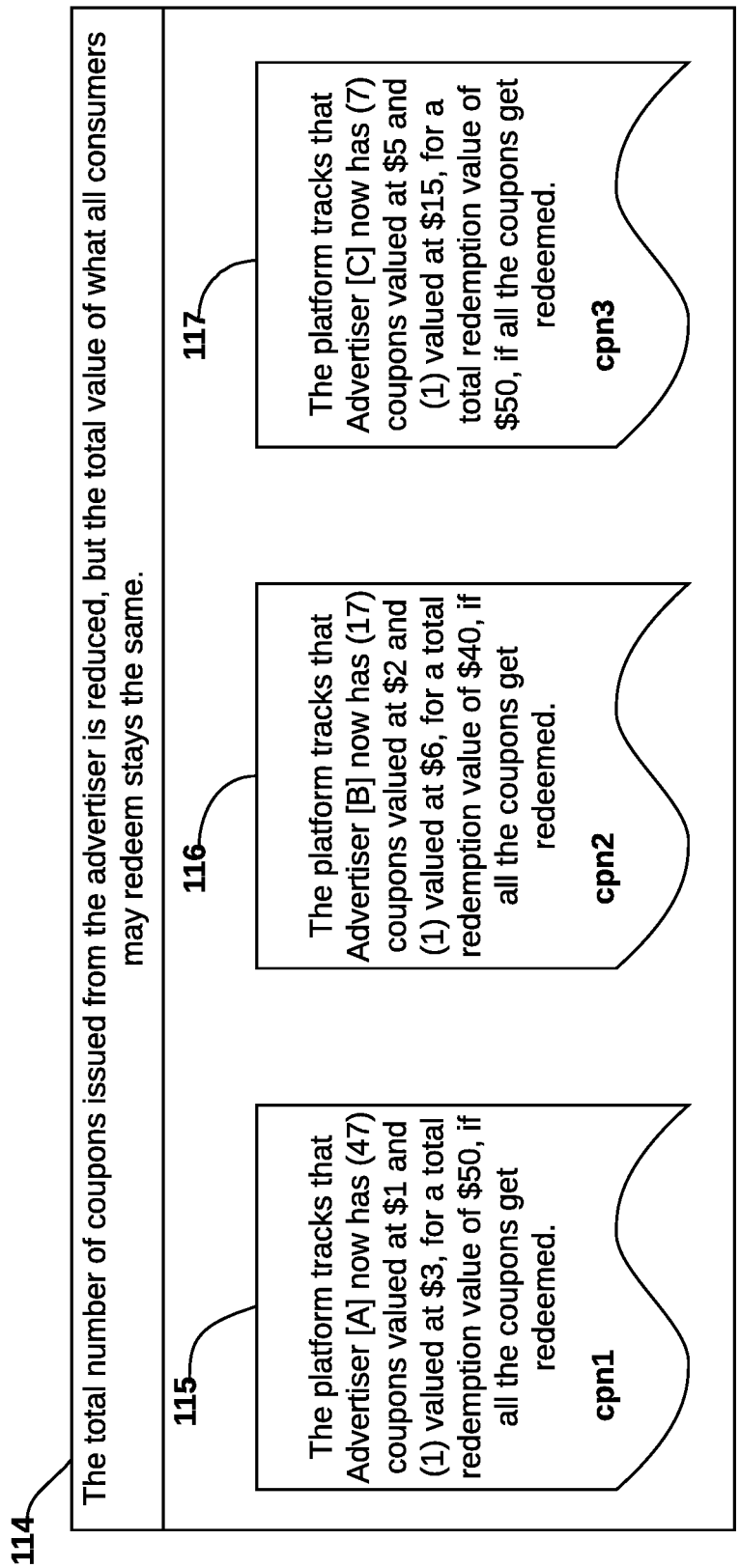
FIG. 3E is a schematic illustration for tracking redemption value of the one or more coupons, according to some implementations of the present disclosure.

Now referring generally to FIGS. 3A-3E, three sample coupon combination process scenarios are depicted to illustrate three exemplary methods for combining coupons on the platform, while still maintaining a total redemption value for the advertiser should all the coupons be redeemed. Three advertisers [A], [B] and [C], along with three Consumers [X], [Y] and [Z] are represented to describe three different examples of how coupons (cpn1, cpn2, & cpn3) can progress and be combined on the platform. In FIG. 3A, block 99 describes when advertisers issue a set number of unique coupons worth a set value if all of the coupons were redeemed by consumers. Then progressing to block 103 of FIG. 3B, consumers collect coupons from various advertisers by registering and saving the coupons on the platform. Then progressing to block 107 of FIG. 3C, consumers combine similar coupons of the same type and from the same advertiser on the platform. Then progressing to block 110 of FIG. 3D, consumers redeem the combined coupons at the new combined cumulative value with the advertiser. Then finally progressing to block 114 of FIG. 3E, the total number of coupons issued from the advertiser is reduced, but the total value of what all consumers may redeem stays the same. According to some implementations, the platform ensures that regardless of how the coupons are combined, the total redemption value of the advertiser's coupons will never be more than the total redemption value of the coupons when first issued. Alternatively, multipliers can be applied to combined coupons as described herein, which may alter the total redemption value of the coupons.

Still referring to FIGS. 3A-3E, the coupon progression of cpn1 is described by 100 in FIG. 3A, where Advertiser [A] issues (50) coupons with a $1 redemption value each for a total redemption value of $50, if all the coupons get redeemed. Then in FIG. 3B the next stage of progression for cpn1 is described by 104 where Consumer [X] registers (1) coupon with a $1 redemption value from Advertiser [A] for a total redemption value of $1 if they were to redeem it now. Now in FIG. 3C the next stage of progression for cpn1 is described in 108, for a plurality of cpn1 coupons, where Consumer [X] can combine similar coupons from Advertiser [A] that they collect before they are redeemed or expire. Next, in FIG. 3D, the progression of the plurality of cpn1 coupons is described in 111 showing if Consumer [X] collects and combines (3) similar coupons from Advertiser [A], the combined coupon would be valued at $3 when redeemed. Finally, in FIG. 3E, the progression of cpn1 ends in 115, where the platform tracks that Advertiser [A] now has (47) coupons valued at $1 and (1) valued at $3, for a total redemption value of $50, if all the coupons get redeemed.

Still referring to FIGS. 3A-3E, the coupon progression of cpn2 is described by 101 in FIG. 3A, where Advertiser [B] issues (20) coupons with a $2 redemption value each for a total redemption value of $40, if all the coupons get redeemed. Then in FIG. 3B the next stage of progression for cpn2 is described by 105 where Consumer [Y] registers (1) coupon with a $2 redemption value from Advertiser [B] for a total redemption value of $2 if they were to redeem it now. Now in FIG. 3C the next stage of progression for cpn2 is described in 109, for a plurality of cpn2 coupons, where Consumer [Y] can combine similar coupons from Advertiser [B] that they collect before they are redeemed or expire. Next, in FIG. 3D, the progression of the plurality of cpn2 coupons is described in 112 showing if Consumer [Y] collects and combines (3) similar coupons from Advertiser [B], the combined coupon would be valued at $6 when redeemed. Finally, in FIG. 3E, the progression of cpn2 ends in 116, where the platform tracks that Advertiser [B] now has (17) coupons valued at $2 and (1) valued at $6, for a total redemption value of $40, if all the coupons get redeemed.

Still referring to FIGS. 3A-3E, the coupon progression of cpn3 is described by 102 in FIG. 3A, where Advertiser [C] issues (10) coupons with a $5 redemption value each for a total redemption value of $50, if all the coupons get redeemed. Then in FIG. 3B the next stage of progression for cpn3 is described by 106 where Consumer [Z] registers (1) coupon with a $5 redemption value from Advertiser [C] for a total redemption value of $5 if they were to redeem it now. Now in FIG. 3C the next stage of progression for cpn3 is described in 110, for a plurality of cpn3 coupons, where Consumer [Z] can combine similar coupons from Advertiser [C] that they collect before they are redeemed or expire. Next, in FIG. 3D, the progression of the plurality of cpn3 coupons is described in 113 showing if Consumer [Z] collects and combines (3) similar coupons from Advertiser [C], the combined coupon would be valued at $15 when redeemed. Finally, in FIG. 3E, the progression of cpn3 ends in 117, where the platform tracks that Advertiser [C] now has (7) coupons valued at $5 and (1) valued at $15, for a total redemption value of $50, if all the coupons get redeemed.

According to some implementations of the present disclosure, the platform calculates and/or determines one or more metrics associated with one or more coupons. For example, the platform determines one or more of the metrics listed in the chart below:

| Platform Metrics | Description | Data Type |
|---|---|---|
| Coupon Perceived Market Demand | The perceived demand of a coupon in the mind of the consumers. | Number |
| Coupon Perceived Market Value | The perceived value of a coupon in the mind of the consumers. | Currency |
| Coupon Collectability Score | How collectable a coupon is. | Number |
| Coupon Trade Velocity | The speed at which a coupon trades between consumers. | Text |
| Coupon Lifecycle Velocity | The speed at which a coupon progresses through its lifecycle. | Text |
| Coupon Peer Perceived Market Demand by Cohort | The perceived demand of a coupon in the mind of a consumer, by demographic. | Currency |
| Coupon Peer Perceived Market Value by Cohort | The perceived value of a coupon in the mind of a consumer, by demographic. | Currency |
| Coupon Peer Collectability Score by Cohort | How collectable a coupon is, by demographic. | Text |
| Coupon Peer Trade Velocity by Cohort | The speed at which a coupon trades between consumers, by demographic. | Text |
| Coupon Peer Lifecycle Velocity by Cohort | The speed at which a coupon progresses through its lifecycle, by demographic. | Text |
| Coupon Peer Registered Ratio by Cohort | The number of registered coupons compared to the number of registered coupons in the same campaign, by demographic. | Text |
| Coupon Peer Searchable Ratio by Cohort | The number of searchable coupons compared to the number of searchable coupons in the same campaign, by demographic. | Text |
| Coupon Peer Traded Ratio by Cohort | The number of traded coupons compared to the number of traded coupons in the same campaign, by demographic. | Text |
| Coupon Peer Stacked Ratio by Cohort | The number of stacked coupons compared to the number of stacked coupons in the same campaign, by demographic. | Text |
| Coupon Peer Redeemed Ratio by Cohort | The number of redeemed coupons compared to the number of redeemed coupons in the same campaign, by demographic. | Text |
| Coupon Peer Expired Ratio by Cohort | The number of expired coupons compared to the number of expired coupons in the same campaign, by demographic. | Text |
| Advertiser Unknown Consumer Score | Metric to rank an individual Advertiser's Campaign Unknown Consumer Count against all others on the platform. | Number |
| Advertiser Awareness Score | Metric to rank an individual Advertiser's Campaign Awareness Count against all others on the platform. | Number |

In some such implementations, the platform determines such metrics using one or more algorithms that are based at least in part on one or more of the platform algorithm variables listed in the chart below:

| Platform Algorithm Variables | Definition | Data Type |
|---|---|---|
| Coupon Face Value | The current redemption value of the coupon. | Currency |
| Coupon Expiration Date | The current expiration date of the coupon. | Date |
| Coupon Expiration Days Remaining | The current number of days remaining before the coupon expiration date. | Number |
| Coupon Redemption Value Multiplier | The multiplier variable that will adjust the coupon face value when stacked with other coupons. | Number |
| Coupon Expiration Date Multiplier | The multiplier variable that will adjust the coupon expiration date when stacked with other coupons. | Number |
| Coupon Stacked Limit | The limit to the number of coupons that can be stacked together for this coupon. | Number |
| Coupon Stacked Face Value | The new coupon expiration date after a coupon has been stacked. | Currency |
| Coupon Stacked Expiration Date | The new coupon face value after a coupon has been stacked. | Date |
| Coupon Stacked Days Remaining | The new current number of days remaining before the coupon expiration date, after a coupon has been stacked. | Number |
| Coupon Trade Limit | The limit to the number of times a coupon may be traded to other consumers. | Number |
| Coupon Issuance Date | The date the coupon was issued to the first targeted consumer. | Date |
| Coupon Registration Date | The date the coupon was registered on the platform. | Date |
| Coupon First Banked Date | The first date the coupon was banked on the platform. | Date |
| Coupon Banked Date | The current date the coupon was recently banked on the platform. | Date |
| Coupon First Searchable Date | The first date the coupon was made searchable on the platform. | Date |
| Coupon Searchable Date | The current date the coupon was recently made searchable on the platform. | Date |

| Platform Algorithm Variables | Definition | Data Type |
|---|---|---|
| Coupon First Traded Date | The first date the coupon was traded on the platform. | Date |
| Coupon Traded Date | The current date the coupon was recently traded on the platform. | Date |
| Coupon First Stacked Date | The first date the coupon was stacked on the platform. | Date |
| Coupon Stacked Date | The date the coupon was stacked on the platform. | Date |
| Coupon Redeemed Date | The date the coupon was redeemed on the platform. | Date |
| Coupon Modified Face Value | The current expiration date of the coupon, if it has been modified by the advertiser during its lifecycle. | Currency |
| Coupon Modified Expiration Date | The current face value of the coupon, if it has been modified by the advertiser during its lifecycle. | Date |
| Coupon Modified Stacked Redemption Value Multiplier | The current redemption value multiplier of the coupon, if it has been modified due to stacking during its lifecycle. | Number |
| Coupon Modified Stacked Expiration Date Multiplier | The current expiration date multiplier of the coupon, if it has been modified due to stacking during its lifecycle. | Number |
| Coupon Modified Stacked Expiration Days Remaining Multiplier | The current expiration days remaining multiplier of the coupon, if it has been modified due to stacking during its lifecycle. | Number |
| Coupon Modified Stacked Limit | The current limit to the number of times this coupon that can be stacked together with other coupons, if it has been modified during its lifecycle. | Number |
| Coupon Modified Iteration Count | The total count of the number of times this coupon has been modified by the advertiser during its lifecycle. | Number |
| Coupon Trade Count | The total count of the number of times this coupon has been traded during its lifecycle. | Number |
| Coupon Stacked Count | The total count of the number of times this coupon has been stacked during its lifecycle. | Number |
| Coupon Modified Count | The total count of the number of times this coupon has been modified by the advertiser during its lifecycle. | Number |
| Coupon Registered by Targeted Consumer | Current status that this coupon is currently Registered by a Targeted Consumer | Check-box |
| Coupon Registered by Known Consumer | Current status that this coupon is currently Registered by a Known Consumer | Check-box |
| Coupon Registered by Unknown Consumer | Current status that this coupon is currently Registered by a Unknown Consumer | Check-box |
| Coupon Banked by Targeted Consumer | Current status that this coupon is currently Banked by a Targeted Consumer | Check-box |
| Coupon Banked by Known Consumer | Current status that this coupon is currently Banked by a Known Consumer | Check-box |
| Coupon Banked by Unknown Consumer | Current status that this coupon is currently Banked by a Unknown Consumer | Check-box |
| Coupon Searchable by Targeted Consumer | Current status that this coupon is currently Searchable by a Targeted Consumer | Check-box |
| Coupon Searchable by Known Consumer | Current status that this coupon is currently Searchable by a Known Consumer | Check-box |
| Coupon Searchable by Unknown Consumer | Current status that this coupon is currently Searchable by a Unknown Consumer | Check-box |
| Coupon Stacked by Targeted Consumer | Current status that this coupon is currently Stacked by a Targeted Consumer | Check-box |
| Coupon Stacked by Known Consumer | Current status that this coupon is currently Stacked by a Known Consumer | Check-box |
| Coupon Stacked by Unknown Consumer | Current status that this coupon is currently Stacked by a Unknown Consumer | Check-box |
| Coupon Redemption by Targeted Consumer | Current status that this coupon is currently Redeemed by a Targeted Consumer | Check-box |
| Coupon Redemption by Known Consumer | Current status that this coupon is currently Redeemed by a Known Consumer | Check-box |
| Coupon Redemption by Unknown Consumer | Current status that this coupon is currently Redeemed by a Unknown Consumer | Check-box |
| Coupon Targeted Consumer Count | Count of all the times an Targeted Consumer interacts with this coupon. | Number |
| Coupon Known Consumer Count | Count of all the times an Known Consumer interacts with this coupon. | Number |
| Coupon Unknown Consumer Count | Count of all the times an Unknown Consumer interacts with this coupon. | Number |
| Coupon Awareness Count | The number of trades that resulted in a new previously unknown consumer that this coupon has reached during its lifecycle. | Number |
| Campaign Start Open Coupon Count | The total number of coupons with the open status at the start of the campaign. | Number |
| Campaign Start Issued Coupon Count | The total number of coupons with the issued status at the start of the campaign. | Number |
| Campaign Start Registered Coupon Count | The total number of coupons with the registered status at the start of the campaign. | Number |
| Campaign Start Searchable Coupon Count | The total number of coupons with the searchable status at the start of the campaign. | Number |
| Campaign Start Traded Coupon Count | The total number of coupons with the traded status at the start of the campaign. | Number |
| Campaign Start Stacked Coupon Count | The total number of coupons with the stacked status at the start of the campaign. | Number |
| Campaign Start Redeemed Coupon Count | The total number of coupons with the redeemed status at the start of the campaign. | Number |
| Campaign Start Expired Coupon Count | The total number of coupons with the expired status at the start of the campaign. | Number |
| Campaign Current Open Coupon Count | The total number of coupons with the open status currently in the campaign. | Number |
| Campaign Current Issued Coupon Count | The total number of coupons with the issued status currently in the campaign. | Number |
| Campaign Current Registered Coupon Count | The total number of coupons with the registered status currently in the campaign. | Number |
| Campaign Current Searchable Coupon Count | The total number of coupons with the searchable status currently in the campaign. | Number |
| Campaign Current Traded Coupon Count | The total number of coupons with the traded status currently in the campaign. | Number |
| Campaign Current Stacked Coupon Count | The total number of coupons with the stacked status currently in the campaign. | Number |
| Campaign Current Redeemed Coupon Count | The total number of coupons with the redeemed status currently in the campaign. | Number |
| Campaign Current Expired Coupon Count | The total number of coupons with the expired status currently in the campaign. | Number |
| Campaign End Open Coupon Count | The total number of coupons with the open status at the end of the campaign. | Number |

| Platform Algorithm Variables | Definition | Data Type |
|---|---|---|
| Campaign End Issued Coupon Count | The total number of coupons with the issued status at the end of the campaign. | Number |
| Campaign End Registered Coupon Count | The total number of coupons with the registered status at the end of the campaign. | Number |
| Campaign End Searchable Coupon Count | The total number of coupons with the searchable status at the end of the campaign. | Number |
| Campaign End Traded Coupon Count | The total number of coupons with the traded status at the end of the campaign. | Number |
| Campaign End Stacked Coupon Count | The total number of coupons with the stacked status at the end of the campaign. | Number |
| Campaign End Redeemed Coupon Count | The total number of coupons with the redeemed status at the end of the campaign. | Number |
| Campaign End Expired Coupon Count | The total number of coupons with the expired status at the end of the campaign. | Number |
| Campaign Start Total Coupon Count | The total number of coupons in the start of the campaign. | Number |
| Campaign Current Total Coupon Count | The total number of coupons currently the campaign, after stacking during the coupons' lifecycle. | Number |
| Campaign End Total Coupon Count | The total number of coupons in the end the campaign, after stacking during the coupons' lifecycle. | Number |
| Campaign Unknown Consumer Count | The total number of all the times an Unknown Consumer interacts with a coupon for this campaign. | Number |
| Campaign Awareness Count | The total number of new trades that resulted in a new previously unknown consumer for all the coupons of this campaign. | Number |

For example, as discussed above, the platform of the present disclosure calculates and/or updates a market value of a coupon at various stages of a lifecycle of the coupon. An algorithm of the present disclosure can be used to calculate and/or estimate the market value of one or more coupons using one or more of the platform algorithm variable listed above. The market value of a coupon is generally the result of a scoring mechanism and/or algorithm of the platform that is based on a variety of factors and/or events/actions that occur to the coupon throughout all of the transactions during the coupon's lifecycle on the platform. In some implementations, the market value is an estimate of a perceived market value of the coupon for one or more consumers with respect to the advertiser that issued the coupon.

Figure 4:
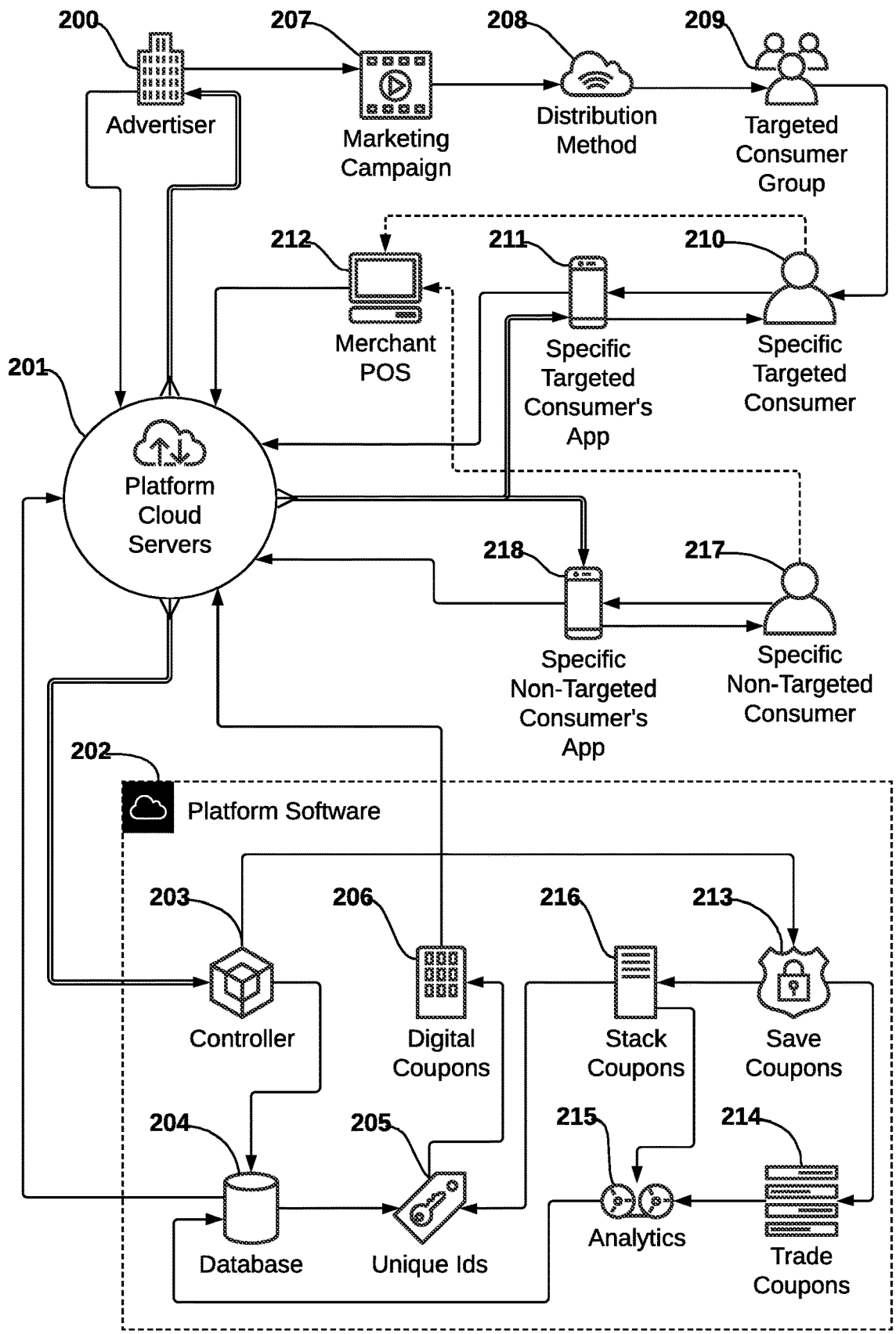
FIG. 4 is a schematic diagram illustrating a system for managing coupons, according to some implementations of the present disclosure.

Referring now to FIG. 4, a flow diagram illustrating the platform software interacting with hardware devices to perform the processes between advertisers and consumers described herein according to some implementations is shown. Advertiser(s) 200 can create a unique set of identifiable coupons on the platform (e.g., in the same or similar manner as step 1 in FIG. 1A) by accessing one or more cloud servers 201 of the platform.

The one or more cloud servers 201 of the platform contain the platform software 202 needed to facilitate the methods of the present disclosure (FIGS. 1A-3E). The one or more cloud servers 202 can include a controller 203 or control system and a database 204 or memory storage device. The controller 203 includes one or more processors configured to execute machine-readable instructions to perform the functions and processes described herein. The database 204 allows for the saving, retrieval and organization of data, such as, for example, unique IDs 205 associated with individual consumers, digital coupons 206 or a record file that maintains specific detailed information associated with one more attributes of a coupon, saved coupon data 213 that associates each of a plurality of the coupons with a corresponding one of a plurality of individual consumers registered on the platform. The platform software 202 also includes trading software 214 for trading coupons or modifying (e.g., updating) the saved coupon data 213 based on trades (e.g., associating a traded coupon with the new consumer). The platform software 202 also includes analytics software 215 for analyzing and/or reporting on the various changes that occur on the platform. The platform software 202 further includes function to allow the ability to stack coupons 216 or the combine the attributes of similar coupons together to create new coupons of similar value.

After the advertiser 200 has accessed the platform cloud servers 201 and created the digital coupons 206, the advertiser 200 creates a marketing campaign 207 to issue the unique coupons via their existing marketing distribution methods 208 (e.g., that are the same as, or similar to, the marketing distribution methods of step 2 of FIG. 1A). The advertiser 200 distributes any number of unique coupons to a list of targeted consumer group 209 (e.g., in the same or similar manner as step 3 of FIG. 1A). The targeted consumer group 209 receives the coupon (e.g., in the same or similar manner as step 4 in FIG. 1A) by any distribution method(s) 208 employed by the advertiser 200, which include, but not are limited to, email, mobile SMS, social media, software applications, print media with web links, etc., or any combination thereof.

A first targeted consumer 210 of the targeted consumer group 209 receives the unique digital coupon from the advertiser 200 in whatever form the unique coupon was distributed via distribution method(s) 208. The first targeted consumer 210 can decide whether to redeem the coupon (e.g., in the same or similar manner as step 5 in FIG. 1A) using the format they received the coupon in (e.g., email, mobile SMS, social media, software applications, print media with web links, etc.).

If the first targeted consumer 210 redeems the coupon (e.g., in the same or similar manner as step 6 of FIG. 1A) directly through a merchant point of service (POS) 212 and becomes a customer (e.g., in the same or similar manner as step 7 of FIG. 1A), then the platform software 202 is updated by platform cloud server(s) 201. The advertiser 200 also receives an update that the first targeted consumer 210 has become a customer by way of the platform cloud server(s) 201.

If the first targeted consumer 210 decides to register, save or trade the coupon (FIGS. 1B-1F), the first targeted consumer 210 does so by accessing the platform cloud server(s) 201 either via an application 211 associated with the first targeted 210, or directly access via a link (e.g., web link) embedded in the format they received the coupon in (e.g., email, mobile SMS, social media, software applications, print media with web links, etc.). The application 211 is executed on a user device (e.g., smartphone, tablet, laptop, etc.) associated with the first targeted consumer 210. The application 211 can be an application that is downloaded and installed on the user device (e.g., from an application store) or a web application (e.g., executing in a web browser on the user device).

If a first non-targeted consumer 217 obtains the coupon by way of searching and trading other coupons on the platform (also referenced previously in FIGS. 1D-1F) via the platform software 202, the first non-targeted consumer 217 does so by accessing the platform cloud server(s) 201 either via an application 218 associated with the first non-targeted consumer or directly via a link (e.g., web link) embedded in the format they received the coupon in (e.g., email, mobile SMS, social media, software applications, print media with web links, etc.). The application 218 is the same as, or similar to, the application 211. The first non-targeted consumer 217 can be any consumer who redeems the coupon, but was not originally part of the marketing campaign 207 of the advertiser 200 and would therefore be considered previously unknown to the advertiser 200 (FIGS. 1D-1F, step 28).

While the present disclosure has been described with reference to one or more particular embodiments and implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A method of managing coupons comprising:
   providing a coupon trading platform operating on one or more cloud servers;
   determining, by the coupon trading platform, a total coupon campaign amount to be issued via a plurality of coupons to a plurality of known consumers, the plurality of coupons being associated with a first party, a first portion of the plurality of known consumers being registered on the coupon trading platform and a second portion of the plurality of known consumers not being registered on the coupon trading platform;
   determining, by the coupon trading platform, a face value for each of the plurality of coupons and storing the face value for each of the plurality of coupons on a memory storage device associated with the one or more cloud servers;
   determining, by the coupon trading platform, a ranking of the plurality of known consumers, the ranking being indicative of how likely each of the plurality of known consumers is (i) to become a customer of the first party, (ii) to use one of the plurality of coupons, (iii) to trade away one of the plurality of coupons, (iv) to trade for one of the plurality of coupons, or (v) any combination thereof;
   transmitting, using the one or more cloud servers, one of the plurality of coupons to each of the plurality of known consumers such that each of the plurality of known consumers is associated with a particular one of the plurality of coupons;
   responsive to a first one of the plurality of known consumers being registered on the coupon trading platform, permitting, via the one or more cloud servers, the first consumer to offer a first one of the plurality of coupons that is associated with the first consumer for trade via the coupon trading platform;
   responsive to the first consumer being registered on the coupon trading platform, permitting, via the one or more cloud servers, the first consumer to search for a second coupon to trade for the first coupon, the second coupon being associated with a second party that is different from the first party;
   responsive to the first consumer trading the first coupon for the second coupon, transmitting, using the one or more cloud servers, a trade notification to the first party, the trade notification including information associated with (i) the first consumer, (ii) the first coupon, (iii) the second coupon, (iv) a second consumer associated with the second coupon, (v) the second party associated with the second coupon, (vi) or any combination thereof; and
   responsive to the first consumer trading the first coupon for the second coupon, updating, via the one or more cloud servers, the ranking of the plurality of known consumers.

2. The method of claim 1, further comprising identifying the second consumer as a previously unknown consumer to the first party based at least in part on the trade notification.

3. The method of claim 1, further comprising, subsequent to the transmitting of the plurality of coupons, modifying an aspect of one or more of the plurality of coupons, wherein the aspect is (i) the face value, (ii) an expiration date, (iii) a permitted redemption location, (iv) a combination of coupons rule, (v) a description of an associated product or service, (vi) or any combination thereof.

4. The method of claim 1, wherein the plurality of coupons are transmitted to the plurality of known consumers electronically via electronic mail, electronically via text message, electronically via a website, via physical mail, via a newspaper, via a magazine, or any combination thereof.

5. The method of claim 1, further comprising, responsive to the first consumer trading the first coupon for the second coupon, transmitting a second trade notification to the second party, the second trade notification including information associated with (i) the first consumer, (ii) the first coupon, (iii) the second coupon, (iv) the second consumer associated with the second coupon, (v) the first party associated with the first coupon, (vi) or any combination thereof.

6. The method of claim 1, responsive to (i) the first consumer being registered on the coupon trading platform and (ii) the first consumer offering the first coupon for trade, providing, via the platform, the first consumer with a second coupon recommendation for trading for the first coupon.

7. The method of claim 1, wherein the first coupon has a market value that is different than the face value of the first coupon, and wherein the market value is at least determined based on the face value of the first coupon, a number of times the first coupon has been traded, a face value of each coupon traded for the first coupon, a type of coupon traded for the first coupon, information associated with any consumer previously associated with the first coupon, or any combination thereof.

8. The method of claim 1, further comprising responsive to the first consumer trading the first coupon for the second coupon, permitting the second consumer to merge the first coupon with a fourth one of the plurality of coupons that is associated with the second consumer, thereby forming a modified coupon.

9. A method of managing coupons comprising:
   providing a coupon trading platform operating on one or more cloud servers;
   determining, by the coupon trading platform, a total coupon campaign amount to be issued via a plurality of coupons to a plurality of known consumers, the plurality of coupons being associated with a first party, a first portion of the plurality of known consumers being registered on the coupon trading platform and a second portion of the plurality of known consumers not being registered on the coupon trading platform;
   determining, by the coupon trading platform, a face value for each of the plurality of coupons and storing the face value for each of the plurality of coupons on a memory storage device associated with the one or more cloud servers;

transmitting, using the one or more cloud servers, one of the plurality of coupons to each of the plurality of known consumers such that each of the plurality of known consumers is associated with a particular one of the plurality of coupons;

responsive to a first one of the plurality of known consumers being registered on the coupon trading platform, permitting, via the one or more cloud servers, the first consumer to merge a first one of the plurality of coupons with a third one of the plurality of coupons that is associated with the first consumer, thereby forming a modified coupon;

responsive to the merger of the first coupon and the third coupon, transmitting, using the one or more cloud servers, a merge notification, wherein the merge notification includes information associated with (i) the first consumer, (ii) the first coupon, (iii) the third coupon, (iv) or any combination thereof;

permitting, via the one or more cloud servers, the first consumer to offer the modified coupon that is associated with the first consumer for trade via the coupon trading platform;

responsive to the first consumer being registered on the coupon trading platform, permitting, via the one or more cloud servers, the first consumer to search for a second coupon to trade for the modified coupon, the second coupon being associated with a second party that is different from the first party; and responsive to the first consumer trading the modified coupon for the second coupon, transmitting, using the one or more cloud servers, a trade notification to the first party, the trade notification including information associated with (i) the first consumer, (ii) the modified coupon, (iii) the second coupon, (iv) a second consumer associated with the second coupon, (v) the second party associated with the second coupon, (vi) or any combination thereof.

10. The method of claim 9, further comprising identifying the second consumer as a previously unknown consumer to the first party based at least in part on the trade notification.

11. The method of claim 9, further comprising, subsequent to the transmitting of the plurality of coupons, modifying an aspect of one or more of the plurality of coupons, wherein the aspect is (i) the face value, (ii) an expiration date, (iii) a permitted redemption location, (iv) a combination of coupons rule, (v) a description of an associated product or service, (vi) or any combination thereof.

12. The method of claim 9, wherein the plurality of coupons are transmitted to the plurality of known consumers electronically via electronic mail, electronically via text message, electronically via a website, via physical mail, via a newspaper, via a magazine, or any combination thereof.

13. The method of claim 9, further comprising, responsive to the first consumer trading the modified coupon for the second coupon, transmitting a second trade notification to the second party, the second trade notification including information associated with (i) the first consumer, (ii) the first coupon, (iii) the second coupon, (iv) the second consumer associated with the second coupon, (v) the first party associated with the first coupon, (vi) or any combination thereof.

14. The method of claim 9, responsive to (i) the first consumer being registered on the coupon trading platform and (ii) the first consumer offering the modified coupon for trade, providing, via the platform, the first consumer with a second coupon recommendation for trading for the modified coupon.

15. The method of claim 9, wherein the first coupon has a market value that is different than the face value of the first coupon, and wherein the market value is at least determined based on the face value of the first coupon, a number of times the first coupon has been traded, a face value of each coupon traded for the first coupon, a type of coupon traded for the first coupon, information associated with any consumer previously associated with the first coupon, or any combination thereof.

16. The method of claim 9, further comprising determining a ranking of the plurality of known consumers and responsive to the first consumer trading the first coupon for the second coupon, updating the ranking of the plurality of known consumers, wherein the ranking is indicative of how likely each of the plurality of known consumers is (i) to become a customer of the first party, (ii) to use one of the plurality of coupons, (iii) to trade away one of the plurality of coupons, (iv) to trade for one of the plurality of coupons, or (v) any combination thereof.

17. The method of claim 9, wherein the modified coupon has a face value equal to a sum of the face value of the first coupon and the face value of the third coupon.

18. The method of claim 9, further comprising responsive to the first consumer trading the modified coupon for the second coupon, permitting the second consumer to merge the modified coupon with a fourth one of the plurality of coupons that is associated with the second consumer, thereby forming an additional modified coupon.

19. A method of managing coupons comprising:

providing a coupon trading platform operating on one or more cloud servers;

determining, by the coupon trading platform, a total coupon campaign amount to be issued via a plurality of coupons to a plurality of known consumers, the plurality of coupons being associated with a first party, a first portion of the plurality of known consumers being registered on the coupon trading platform and a second portion of the plurality of known consumers not being registered on the coupon trading platform;

determining, by the coupon trading platform, a face value for each of the plurality of coupons and storing the face value for each of the plurality of coupons on a memory storage device associated with the one or more cloud servers;

transmitting, using the one or more cloud servers, one of the plurality of coupons to each of the plurality of known consumers such that each of the plurality of known consumers is associated with a particular one of the plurality of coupons;

responsive to a first one of the plurality of known consumers being registered on the coupon trading platform, permitting, via the one or more cloud servers, the first consumer to merge the first coupon with a third one of the plurality of coupons that is associated with the first consumer, thereby forming a modified coupon having a face value equal to a sum of the face value of the first coupon and the face value of the third coupon;

permitting, via the one or more cloud servers, the first consumer to offer the modified coupon that is associated with the first consumer for trade via the coupon trading platform;

responsive to the first consumer being registered on the coupon trading platform, permitting, via the one or more cloud servers, the first consumer to search for a second coupon to trade for the modified coupon, the second coupon being associated with a second party that is different from the first party; and responsive to the first consumer trading the first coupon for the second coupon, transmitting, using the one or more cloud servers, a trade notification to the first party, the trade notification including information associated with (i) the first consumer, (ii) the first coupon, (iii) the second coupon, (iv) a second consumer associated with the second coupon, (v) the second party associated with the second coupon, (vi) or any combination thereof.

20. The method of claim 19, further comprising identifying the second consumer as a previously unknown consumer to the first party based at least in part on the trade notification.

21. The method of claim 19, further comprising, subsequent to the transmitting of the plurality of coupons, modifying an aspect of one or more of the plurality of coupons, wherein the aspect is (i) the face value, (ii) an expiration date, (iii) a permitted redemption location, (iv) a combination of coupons rule, (v) a description of an associated product or service, (vi) or any combination thereof.

22. The method of claim 19, wherein the plurality of coupons are transmitted to the plurality of known consumers electronically via electronic mail, electronically via text message, electronically via a website, via physical mail, via a newspaper, via a magazine, or any combination thereof.

23. The method of claim 19, further comprising, responsive to the first consumer trading the modified coupon for the second coupon, transmitting a second trade notification to the second party, the second trade notification including information associated with (i) the first consumer, (ii) the first coupon, (iii) the second coupon, (iv) the second consumer associated with the second coupon, (v) the first party associated with the first coupon, (vi) or any combination thereof.

24. The method of claim 19, responsive to (i) the first consumer being registered on the coupon trading platform and (ii) the first consumer offering the modified coupon for trade, providing, via the platform, the first consumer with a second coupon recommendation for trading for the modified coupon.

25. The method of claim 19, wherein the first coupon has a market value that is different than the face value of the first coupon, and wherein the market value is at least determined based on the face value of the first coupon, a number of times the first coupon has been traded, a face value of each coupon traded for the first coupon, a type of coupon traded for the first coupon, information associated with any consumer previously associated with the first coupon, or any combination thereof.

26. The method of claim 19, further comprising determining a ranking of the plurality of known consumers and responsive to the first consumer trading the modified coupon for the second coupon, updating the ranking of the plurality of known consumers, wherein the ranking is indicative of how likely each of the plurality of known consumers is (i) to become a customer of the first party, (ii) to use one of the plurality of coupons, (iii) to trade away one of the plurality of coupons, (iv) to trade for one of the plurality of coupons, or (v) any combination thereof.

27. The method of claim 19, further comprising responsive to the merger of the first coupon and the third coupon, transmitting a merge notification, wherein the merge notification includes information associated with (i) the first consumer, (ii) the first coupon, (iii) the third coupon, (iv) or any combination thereof.

28. The method of claim 19, further comprising responsive to the first consumer trading the modified coupon for the second coupon, permitting the second consumer to merge the modified coupon with a fourth one of the plurality of coupons that is associated with the second consumer, thereby forming an additional modified coupon.

* * * * *